United States Patent
Ishikawa et al.

(10) Patent No.: US 11,072,703 B2
(45) Date of Patent: *Jul. 27, 2021

(54) POLYCARBONATE-BASED RESIN COMPOSITION AND MOLDED PRODUCT THEREOF

(71) Applicant: IDEMITSU KOSAN CO., LTD., Tokyo (JP)

(72) Inventors: Yasuhiro Ishikawa, Ichihara (JP); Tomoko Abe, Tokyo (JP); Yohei Koori, Chiba (JP)

(73) Assignee: IDEMITSU KOSAN CO., LTD., Tokyo (JP)

(*) Notice: Subject to any disclaimer, the term of this patent is extended or adjusted under 35 U.S.C. 154(b) by 13 days.

This patent is subject to a terminal disclaimer.

(21) Appl. No.: 16/490,029

(22) PCT Filed: Mar. 1, 2018

(86) PCT No.: PCT/JP2018/007884
§ 371 (c)(1),
(2) Date: Aug. 29, 2019

(87) PCT Pub. No.: WO2018/159778
PCT Pub. Date: Sep. 7, 2018

(65) Prior Publication Data
US 2020/0010671 A1    Jan. 9, 2020

(30) Foreign Application Priority Data

Mar. 1, 2017 (JP) .............................. JP2017-038839

(51) Int. Cl.
| | | |
|---|---|---|
| *C08L 69/00* | (2006.01) | |
| *C08G 64/18* | (2006.01) | |
| *C08G 77/448* | (2006.01) | |
| *C08L 67/02* | (2006.01) | |
| *C08L 83/04* | (2006.01) | |

(52) U.S. Cl.
CPC ............ *C08L 69/00* (2013.01); *C08G 64/186* (2013.01); *C08G 77/448* (2013.01); *C08L 67/02* (2013.01); *C08L 83/04* (2013.01); *C08L 2203/20* (2013.01)

(58) Field of Classification Search
USPC ................................................. 528/196, 198
See application file for complete search history.

(56) References Cited

U.S. PATENT DOCUMENTS

| | | | |
|---|---|---|---|
| 6,676,852 B2 | 1/2004 | Brown et al. | |
| 2003/0227002 A1 | 12/2003 | Brown et al. | |
| 2013/0190425 A1 | 7/2013 | Zhu et al. | |
| 2020/0362104 A1* | 11/2020 | Ishikawa ................. | C08K 5/20 |

FOREIGN PATENT DOCUMENTS

| | | |
|---|---|---|
| CN | 100365094 C | 1/2008 |
| CN | 104039890 A | 9/2014 |
| JP | H08-302178 A | 11/1996 |
| JP | 2662310 B2 | 10/1997 |
| JP | 2005-528509 A | 9/2005 |
| JP | 2006-227177 A | 8/2006 |
| JP | 2010-215791 A | 9/2010 |
| JP | 2011-021127 A | 2/2011 |
| JP | 2012-246390 A | 12/2012 |
| JP | 2013-221072 A | 10/2013 |
| JP | 2014-231561 A | 12/2014 |
| JP | 2015-059138 A | 3/2015 |
| WO | WO-2011/155490 A1 | 12/2011 |

OTHER PUBLICATIONS

Pixton et al., "Structure to Property Relationships in Polycarbonate/Polydimethylsiloxane Copolymers," Annual Technical Conference, May 7, 2006. pp. 2655-2659.
The International Bureau of WIPO, "PCT Third Party Observation," issued in connection with International Patent Application No. PCT/JP2018/007884, dated Jun. 4, 2019.
International Searching Authority, "International Search Report," issued in connection with International Patent Application No. PCT/JP2018/007884, dated May 22, 2018.
International Searching Authority, "Written Opinion," issued in connection with International Patent Application No. PCT/JP2018/007884, dated May 22, 2018.
Chinese Patent Office, "Office Action," issued in connection with Chinese Patent Application No. 201880015110.1, dated Jun. 9, 2021.

* cited by examiner

*Primary Examiner* — Terressa Boykin
(74) *Attorney, Agent, or Firm* — Foley & Lardner LLP

(57) ABSTRACT

Provided is a polycarbonate-based resin composition, including: 50 mass % or more to 99 mass % or less of a polycarbonate-based resin (S) containing a polycarbonate-polyorganosiloxane copolymer (A) containing a polycarbonate block (A-1) formed of a specific repeating unit and a polyorganosiloxane block (A-2) containing a specific repeating unit, and an aromatic polycarbonate-based resin (B) except the polycarbonate-polyorganosiloxane copolymer (A); and 1 mass % or more to 50 mass % or less of a polyester-based resin (C), wherein the polyorganosiloxane block (A-2) has an average chain length of from 50 or more to 500 or less.

24 Claims, 7 Drawing Sheets

FIG.1

Distance between two points of tangency at time of drawing a tangent to the domain having an opening, the opening having two end portion α and β corresponding to points of tangency

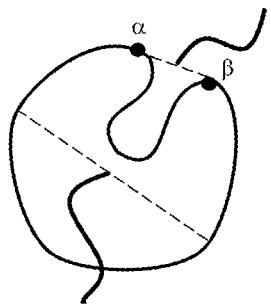

Long-axis distance of domain

FIG.2

Distance between two points of tangency at time of drawing a tangent to the domain having an opening, the opening having two end portion α and β corresponding to points of tangency

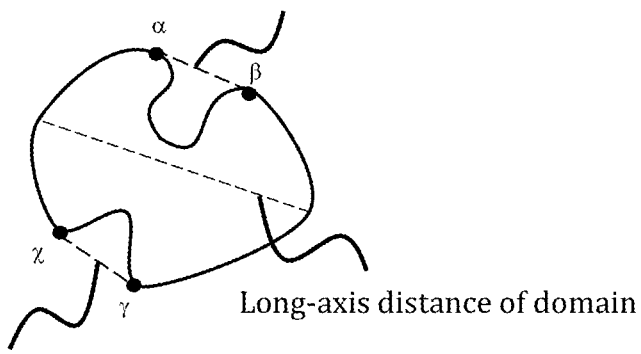

Long-axis distance of domain

Distance between two points of tangency at time of drawing a tangent to the domain having an opening, the opening having two end portion χ and γ corresponding to points of tangency Distance between two points of tangency at time of drawing a tangent to the domain having an opening, the opening having two end portion α and β corresponding to points of tangency Long-axis distance of domain

POLYCARBONATE-BASED RESIN COMPOSITION AND MOLDED PRODUCT THEREOF

RELATED APPLICATIONS

The present application claims priority under 37 U.S.C. § 371 to International Patent Application No. PCT/JP2018/007884, filed Mar. 1, 2018, which claims priority to and the benefit of Japanese Patent Application No. 2017-038839, filed on Mar. 1, 2017. The contents of these applications are hereby incorporated by reference in their entireties.

TECHNICAL FIELD

The present invention relates to a polycarbonate-based resin composition including a polycarbonate-polyorganosiloxane copolymer, and a molded article of the composition. Specifically, the polycarbonate-based resin composition of the present invention includes a plurality of kinds of resins.

BACKGROUND ART

A polycarbonate-polyorganosiloxane copolymer (hereinafter sometimes abbreviated as "PC-POS copolymer") has been attracting attention because of its excellent properties, such as high impact resistance, chemical resistance, and flame retardancy.

Accordingly, the polycarbonate-polyorganosiloxane copolymer has been expected to be widely utilized in various fields, such as the field of electrical and electronic equipment and the field of automobiles. In particular, the utilization of the polycarbonate-polyorganosiloxane copolymer in casings for a cellular phone, a mobile personal computer, a digital camera, a video camera, an electric tool, a communication base station, a battery, and the like, and in other commodities has been expanding.

In normal cases, a homopolycarbonate using 2,2-bis(4-hydroxyphenyl)propane [common name: bisphenol A] as a dihydric phenol serving as a raw material has been generally used as a typical polycarbonate. A polycarbonate-polyorganosiloxane copolymer using a polyorganosiloxane as a copolymerizable monomer has been known for improving the physical properties of the homopolycarbonate, such as flame retardancy and impact resistance (Patent Document 1).

Examples of an approach to further improving the impact resistance of a polycarbonate resin containing the polycarbonate-polyorganosiloxane copolymer may include an approach involving using a polyorganosiloxane having a long chain length, and an approach involving increasing the amount of the polyorganosiloxane in the polycarbonate-polyorganosiloxane copolymer as described in Patent Documents 2 and 3.

CITATION LIST

Patent Document

Patent Document 1: JP 2662310 B2
Patent Document 2: JP 2011-21127 A
Patent Document 3: JP 2012-246390 A

SUMMARY OF INVENTION

Technical Problem

As described above, the polycarbonate-polyorganosiloxane copolymer is excellent in impact resistance, but it has been required to obtain a polycarbonate-based resin composition further improved in chemical resistance.

Solution to Problem

The inventors of the present invention have found that the addition of a polyester-based resin to a polycarbonate-based resin including a polycarbonate-polyorganosiloxane copolymer having a polyorganosiloxane block having a specific chain length provides a polycarbonate-based resin composition excellent in impact resistance and chemical resistance. Further, the inventors have found that, when a polycarbonate-based resin composition whose polycarbonate-polyorganosiloxane copolymer has a specific domain structure is prepared, a polycarbonate-based resin composition that has more excellent impact resistance and is excellent in chemical resistance is obtained without the extension of the chain length of the polyorganosiloxane block or an increase in content thereof.

That is, the present invention relates to the following items [1] to [24].

[1] A polycarbonate-based resin composition, comprising: 50 mass % or more to 99 mass % or less of a polycarbonate-based resin (S) containing a polycarbonate-polyorganosiloxane copolymer (A) containing a polycarbonate block (A-1) formed of a repeating unit represented by the following general formula (I) and a polyorganosiloxane block (A-2) containing a repeating unit represented by the following general formula (II), and an aromatic polycarbonate-based resin (B) except the polycarbonate-polyorganosiloxane copolymer (A); and 1 mass % or more to 50 mass % or less of a polyester-based resin (C), wherein the polyorganosiloxane block (A-2) has an average chain length of from 50 or more to 500 or less:

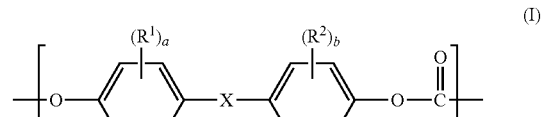

wherein $R^1$ and $R^2$ each independently represent a halogen atom, an alkyl group having 1 to 6 carbon atoms, or an alkoxy group having 1 to 6 carbon atoms, X represents a single bond, an alkylene group having 1 to 8 carbon atoms, an alkylidene group having 2 to 8 carbon atoms, a cycloalkylene group having 5 to 15 carbon atoms, a cycloalkylidene group having 5 to 15 carbon atoms, a fluorenediyl group, an arylalkylene group having 7 to 15 carbon atoms, an arylalkylidene group having 7 to 15 carbon atoms, —S—, —SO—, —SO$_2$—, —O—, or —CO—, $R^3$ and $R^4$ each independently represent a hydrogen atom, a halogen atom, an alkyl group having 1 to 6 carbon atoms, an alkoxy group having 1 to 6 carbon atoms, or an aryl group having 6 to 12 carbon atoms, and "a" and "b" each independently represent an integer of from 0 to 4.

[2] A polycarbonate-based resin composition, comprising: a polycarbonate-based resin (S) satisfying the following requirements (1) and (2); and a polyester-based resin (C) to be blended into the polycarbonate-based resin (S), wherein a ratio of the polycarbonate-based resin (S) to 100 mass % of a total amount of the polycarbonate-based resin (S) and the polyester-based resin (C) is from 50 mass % or more to 99 mass % or less:

(1) the polycarbonate-based resin (S) contains a polycarbonate-polyorganosiloxane copolymer (A) containing a polycarbonate block (A-1) formed of a repeating unit represented by the following general formula (I) and a polyorganosiloxane block (A-2) containing a repeating unit represented by the following general formula (II), and an aromatic polycarbonate-based resin (B) except the polycarbonate-polyorganosiloxane copolymer (A); and (2) the polycarbonate-based resin (S) has a structure in which a domain (d-1) containing the polyorganosiloxane block (A-2) is present in a matrix containing the aromatic polycarbonate-based resin (B) as a main component, and a domain (d-2) containing at least one selected from a block derived from the aromatic polycarbonate-based resin (B) and the polycarbonate block (A-1) is present inside the domain (d-1):

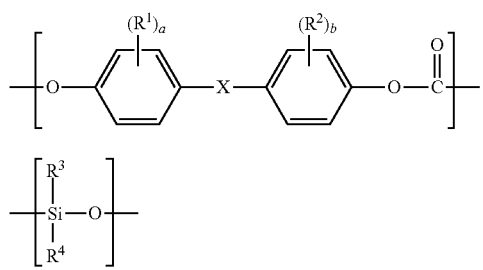

wherein $R^1$ and $R^2$ each independently represent a halogen atom, an alkyl group having 1 to 6 carbon atoms, or an alkoxy group having 1 to 6 carbon atoms, X represents a single bond, an alkylene group having 1 to 8 carbon atoms, an alkylidene group having 2 to 8 carbon atoms, a cycloalkylene group having 5 to 15 carbon atoms, a cycloalkylidene group having 5 to 15 carbon atoms, a fluorenediyl group, an arylalkylene group having 7 to 15 carbon atoms, an arylalkylidene group having 7 to 15 carbon atoms, —S—, —SO—, —SO$_2$—, —O—, or —CO—, $R^3$ and $R^4$ each independently represent a hydrogen atom, a halogen atom, an alkyl group having 1 to 6 carbon atoms, an alkoxy group having 1 to 6 carbon atoms, or an aryl group having 6 to 12 carbon atoms, and "a" and "b" each independently represent an integer of from 0 to 4.

[3] A polycarbonate-based resin composition, comprising:

50 mass % or more to 99 mass % or less of a polycarbonate-based resin (S) containing a polycarbonate-polyorganosiloxane copolymer (A) containing a polycarbonate block (A-1) formed of a repeating unit represented by the following general formula (I) and a polyorganosiloxane block (A-2) containing a repeating unit represented by the following general formula (II), and an aromatic polycarbonate-based resin (B) except the polycarbonate-polyorganosiloxane copolymer (A); and 1 mass % or more to 50 mass % or less of a polyester-based resin (C), wherein the polycarbonate-based resin composition has a structure in which a domain ($d^c$-1) containing the polyorganosiloxane block (A-2) is present in a matrix containing the aromatic polycarbonate-based resin (B) as a main component, and a domain ($d^c$-2) containing at least one selected from a block derived from the aromatic polycarbonate-based resin (B) and the polycarbonate block (A-1) is present inside the domain ($d^c$-1):

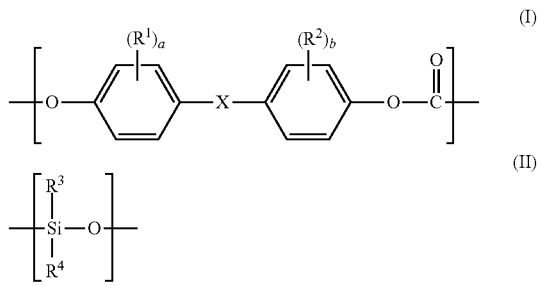

wherein $R^1$ and $R^2$ each independently represent a halogen atom, an alkyl group having 1 to 6 carbon atoms, or an alkoxy group having 1 to 6 carbon atoms, X represents a single bond, an alkylene group having 1 to 8 carbon atoms, an alkylidene group having 2 to 8 carbon atoms, a cycloalkylene group having 5 to 15 carbon atoms, a cycloalkylidene group having 5 to 15 carbon atoms, a fluorenediyl group, an arylalkylene group having 7 to 15 carbon atoms, an arylalkylidene group having 7 to 15 carbon atoms, —S—, —SO—, —SO$_2$—, —O—, or —CO—, $R^3$ and $R^4$ each independently represent a hydrogen atom, a halogen atom, an alkyl group having 1 to 6 carbon atoms, an alkoxy group having 1 to 6 carbon atoms, or an aryl group having 6 to 12 carbon atoms, and "a" and "b" each independently represent an integer of from 0 to 4.

[4] The polycarbonate-based resin composition according to any one of the above-mentioned items [1] to [3], wherein a mass ratio "(A)/(B)" of the polycarbonate-polyorganosiloxane copolymer (A) to the aromatic polycarbonate-based resin (B) in the polycarbonate-based resin (S) is from 0.1/99.9 to 99.9/0.1.

[5] The polycarbonate-based resin composition according to any one of the above-mentioned items [1] to [4], wherein the aromatic polycarbonate-based resin (B) contains a polycarbonate block including, in a main chain thereof, a repeating unit represented by the following general formula (III):

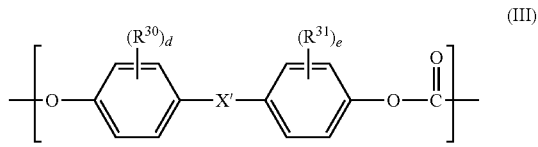

wherein $R^{30}$ and $R^{31}$ each independently represent a halogen atom, an alkyl group having 1 to 6 carbon atoms, or an alkoxy group having 1 to 6 carbon atoms, X' represents a single bond, an alkylene group having 1 to 8 carbon atoms, an alkylidene group having 2 to 8 carbon atoms, a cycloalkylene group having 5 to 15 carbon atoms, a cycloalkylidene group having 5 to 15 carbon atoms, —S—, —SO—, —SO$_2$—, —O—, or —CO—, and "d" and "e" each independently represent an integer of from 0 to 4.

[6] The polycarbonate-based resin composition according to anyone of the above-mentioned items [2] to [5], wherein the domain (d-1) or ($d^c$-1) is mainly formed of the polyorganosiloxane block (A-2).

[7] The polycarbonate-based resin composition according to anyone of the above-mentioned items [2] to [6], wherein the domain (d-2) or ($d^c$-2) is mainly formed of at least one selected from the block derived from the aromatic polycarbonate-based resin (B) and the polycarbonate block (A-1).

[8] The polycarbonate-based resin composition according to any one of the above-mentioned items [2] to [7], wherein only the one domain (d-2) is present inside the domain (d-1), or only the one domain ($d^c$-2) is present inside the domain ($d^c$-1).

[9] The polycarbonate-based resin composition according to any one of the above-mentioned items [2] to [7], wherein the two or more domains (d-2) are present inside the domain (d-1), or the two or more domains ($d^c$-2) are present inside the domain ($d^c$-1).

[10] The polycarbonate-based resin composition according to any one of the above-mentioned items [2] to [9], wherein a ratio of a number of domains (d) in each of which the domain (d-2) is present inside the domain (d-1) to a total number of the domains (d) and domains (d') each formed only of the domain (d-1), or a ratio of a number of domains ($d^c$) in each of which the domain ($d^c$-2) is present inside the domain ($d^c$-1) to a total number of the domains ($d^c$) and domains ($d'^c$) each formed only of the domain ($d^c$-1) is from 2% or more to 100% or less.

[11] The polycarbonate-based resin composition according to the above-mentioned item [10], wherein all domains corresponding to a total of the domains (d) and the domains (d') or a total of the domains ($d^c$) and the domains ($d'^c$) have an average sectional area of 200 $nm^2$ or more.

[12] The polycarbonate-based resin composition according to the above-mentioned item [10] or [11], wherein all domains corresponding to a total of the domains (d) and the domains (d') or a total of the domains ($d^c$) and the domains ($d'^c$) have an average sectional area of 20,000 $nm^2$ or less.

[13] The polycarbonate-based resin composition according to anyone of the above-mentioned items [10] to [12], wherein an average of distances between adjacent particles of all domains corresponding to a total of the domains (d) and the domains (d') or a total of the domains ($d^c$) and the domains ($d'^c$) is 500 nm or less.

[14] The polycarbonate-based resin composition according to anyone of the above-mentioned items [10] to [13], wherein an average of distances between adjacent particles of all domains corresponding to a total of the domains (d) and the domains (d') or a total of the domains ($d^c$) and the domains ($d'^c$) is 50 nm or more.

[15] The polycarbonate-based resin composition according to any one of the above-mentioned items [2] to [14], wherein the polyorganosiloxane block (A-2) has an average chain length of from 30 or more to 500 or less.

[16] The polycarbonate-based resin composition according to any one of the above-mentioned items [1] to [15], wherein the polyorganosiloxane block (A-2) has an average chain length of from 55 or more to 500 or less.

[17] The polycarbonate-based resin composition according to anyone of the above-mentioned items [1] to [16], wherein a content of the polyorganosiloxane block (A-2) in the polycarbonate-polyorganosiloxane copolymer (A) is from 10 mass % or more to 70 mass % or less.

[18] The polycarbonate-based resin composition according to any one of the above-mentioned items [1] to [17], wherein a content of the polyorganosiloxane block (A-2) in the polycarbonate-based resin (S) is from 0.1 mass % or more to 10 mass % or less.

[19] The polycarbonate-based resin composition according to any one of the above-mentioned items [1] to [18], wherein the polycarbonate-polyorganosiloxane copolymer (A) has a viscosity-average molecular weight (Mv) of from 9,000 or more to 50,000 or less.

[20] The polycarbonate-based resin composition according to any one of the above-mentioned items [1] to [19], wherein the polycarbonate-based resin (S) has a viscosity-average molecular weight (Mv) of from 9,000 or more to 50,000 or less.

[21] The polycarbonate-based resin composition according to any one of the above-mentioned items [1] to [20], wherein the polyester-based resin (C) comprises at least one selected from a polyethylene terephthalate and a polybutylene terephthalate.

[22] A molded article, which is obtained by molding the polycarbonate-based resin composition of any one of the above-mentioned items [1] to [21]. [23] The molded article according to the above-mentioned item [22], wherein the molded article comprises a casing for electrical and electronic equipment.

[24] The molded article according to the above-mentioned item [22], wherein the molded article comprises parts for an automobile and a building material.

Advantageous Effects of Invention

According to the present invention, the polycarbonate-based resin composition that has more excellent impact resistance and is excellent in chemical resistance, and the molded article of the composition can be obtained without the extension of the chain length of the polyorganosiloxane block or an increase in content thereof.

BRIEF DESCRIPTION OF DRAWINGS

FIG. 1 is a view for illustrating the long-axis distance of a domain having one opening portion and the distance thereof between two contact points at the time of the drawing of a tangent of the domain, the tangent having two end portions of the opening portion as the contact points.

FIG. 2 is a view for illustrating the long-axis distance of a domain having two opening portions and each distance thereof between two contact points at the time of the drawing of a tangent of the domain, the tangent having two end portions of anyone of the opening portions as the contact points.

DESCRIPTION OF EMBODIMENTS

Figure 3:
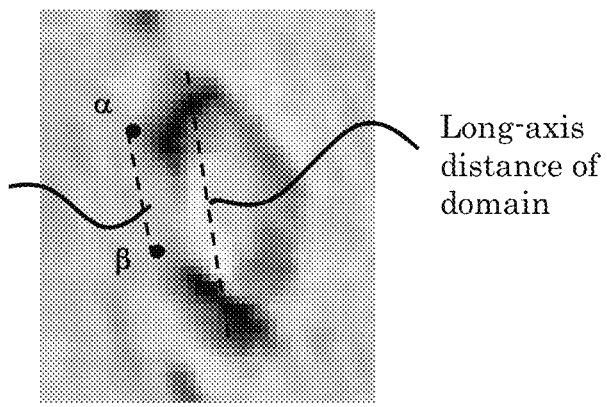
FIG. 3 is a scanning probe microscope image for showing the long-axis distance of a domain having one opening portion and the distance thereof between two contact points at the time of the drawing of a tangent of the domain, the tangent having two end portions of the opening portion as the contact points.

The inventors of the present invention have made an extensive investigation, and as a result, have found that the addition of a polyester-based resin to a polycarbonate-based resin including a polycarbonate-polyorganosiloxane copolymer having a polyorganosiloxane block having a specific chain length provides a polycarbonate-based resin composition excellent in impact resistance and chemical resistance. Further, the inventors have found that, when a polycarbonate-based resin composition whose polycarbonate-polyorganosiloxane copolymer has a specific domain structure is prepared, a polycarbonate-based resin composition that has more excellent impact resistance and is excellent in chemical resistance is obtained without the extension of the chain length of the polyorganosiloxane block or an increase in content thereof. Detailed description is given below.

The term "XX to YY" as used herein means "from XX or more to YY or less." In this description, a specification considered to be preferred may be arbitrarily adopted, and a combination of preferred specifications is more preferred.

<Polycarbonate-Based Resin Composition>

A polycarbonate-based resin composition according to a first embodiment of the present invention comprises: 50 mass % or more to 99 mass % or less of a polycarbonate-based resin (S) containing a polycarbonate-polyorganosiloxane copolymer (A) containing a polycarbonate block (A-1) formed of a repeating unit represented by the following general formula (I) and a polyorganosiloxane block (A-2) containing a repeating unit represented by the following general formula (II), and an aromatic polycarbonate-based resin (B) except the polycarbonate-polyorganosiloxane copolymer (A); and 1 mass % or more to 50 mass % or less of a polyester-based resin (C), wherein the polyorganosiloxane block (A-2) has an average chain length of from 50 or more to 500 or less:

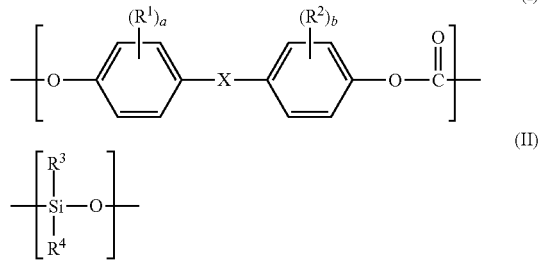

wherein $R^1$ and $R^2$ each independently represent a halogen atom, an alkyl group having 1 to 6 carbon atoms, or an alkoxy group having 1 to 6 carbon atoms, X represents a single bond, an alkylene group having 1 to 8 carbon atoms, an alkylidene group having 2 to 8 carbon atoms, a cycloalkylene group having 5 to 15 carbon atoms, a cycloalkylidene group having 5 to 15 carbon atoms, a fluorenediyl group, an arylalkylene group having 7 to 15 carbon atoms, an arylalkylidene group having 7 to 15 carbon atoms, —S—, —SO—, —SO$_2$—, —O—, or —CO—, $R^3$ and $R^4$ each independently represent a hydrogen atom, a halogen atom, an alkyl group having 1 to 6 carbon atoms, an alkoxy group having 1 to 6 carbon atoms, or an aryl group having 6 to 12 carbon atoms, and "a" and "b" each independently represent an integer of from 0 to 4.

A polycarbonate-based resin composition according to a second embodiment of the present invention comprises: a polycarbonate-based resin (S) satisfying the following requirements (1) and (2); and a polyester-based resin (C) to be blended into the polycarbonate-based resin (S), wherein a ratio of the polycarbonate-based resin (S) to 100 mass % of a total amount of the polycarbonate-based resin (S) and the polyester-based resin (C) is from 50 mass % or more to 99 mass % or less:

(1) the polycarbonate-based resin (S) contains a polycarbonate-polyorganosiloxane copolymer (A) containing a polycarbonate block (A-1) formed of a repeating unit represented by the following general formula (I) and a polyorganosiloxane block (A-2) containing a repeating unit represented by the following general formula (II), and an aromatic polycarbonate-based resin (B) except the polycarbonate-polyorganosiloxane copolymer (A); and (2) the polycarbonate-based resin (S) has a structure in which a domain (d-1) containing the polyorganosiloxane block (A-2) is present in a matrix containing the aromatic polycarbonate-based resin (B) as a main component, and a domain (d-2) containing at least one selected from a block derived from the aromatic polycarbonate-based resin (B) and the polycarbonate block (A-1) is present inside the domain (d-1):

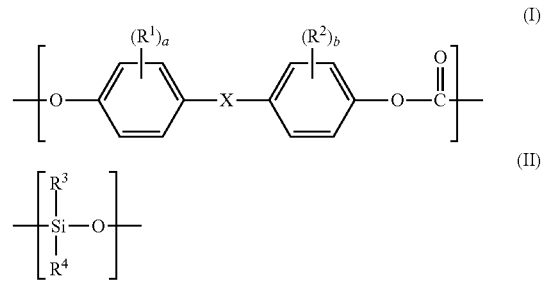

wherein $R^1$ and $R^2$ each independently represent a halogen atom, an alkyl group having 1 to 6 carbon atoms, or an alkoxy group having 1 to 6 carbon atoms, X represents a single bond, an alkylene group having 1 to 8 carbon atoms, an alkylidene group having 2 to 8 carbon atoms, a cycloalkylene group having 5 to 15 carbon atoms, a cycloalkylidene group having 5 to 15 carbon atoms, a fluorenediyl group, an arylalkylene group having 7 to 15 carbon atoms, an arylalkylidene group having 7 to 15 carbon atoms, —S—, —SO—, —SO$_2$—, —O—, or —CO—, and "a" and "b" each independently represent an integer of from 0 to 4.

In the general formula (II), $R^3$ and $R^4$ each independently represent a hydrogen atom, a halogen atom, an alkyl group having 1 to 6 carbon atoms, an alkoxy group having 1 to 6 carbon atoms, or an aryl group having 6 to 12 carbon atoms.

Specific examples of $R^1$ to $R^4$, X, "a", and "b" in the formulae are described later.

<Polycarbonate-Based Resin (S)>

The content of the polycarbonate-polyorganosiloxane copolymer (A) in the polycarbonate-based resin (S) is typically 0.1 mass % or more, preferably 1 mass % or more, more preferably 3 mass % or more, still more preferably 10 mass % or more, and is typically 99.9 mass % or less, preferably 99 mass % or less, more preferably 30 mass % or less, still more preferably 25 mass % or less, particularly preferably 20 mass % or less, most preferably 16 mass % or less from the viewpoint that a resin composition having desired properties, such as impact resistance, is obtained.

The content of the aromatic polycarbonate-based resin (B) in the polycarbonate-based resin (S) is typically 0.1 mass % or more, preferably 1 mass % or more, more preferably 50 mass % or more, still more preferably 70 mass % or more, still further more preferably 80 mass % or more, and is typically 99.9 mass % or less, preferably 99 mass % or less, more preferably 98 mass % or less, still more preferably 80 mass % or less from the viewpoint that a resin composition having desired properties, such as impact resistance, is obtained.

In one aspect of this embodiment, the total amount of the polycarbonate-polyorganosiloxane copolymer (A) and the aromatic polycarbonate-based resin (B) is 100 mass %.

In the present invention, the mass ratio "(A)/(B)" of the polycarbonate-polyorganosiloxane copolymer (A) to the aromatic polycarbonate-based resin (B) is typically from 0.1/99.9 to 99.9/0.1, preferably from 1/99 to 99/1, more preferably from 2/98 to 50/50, still more preferably from 5/95 to 20/80 from the viewpoint that a resin composition having desired properties, such as impact resistance, is obtained.

In the above-mentioned second embodiment of the present invention, the following condition is further required. In the polycarbonate-based resin (S), the domain (d-1) containing the polyorganosiloxane block (A-2) is present in at least the matrix containing the aromatic polycarbonate-based resin (B) component as a main component, and the domain (d-2) containing at least one selected from the block derived from the aromatic polycarbonate-based resin (B) and the polycarbonate block (A-1) is further present inside the domain (d-1). Only the one domain (d-2) may be present inside the one domain (d-1), or the two or more domains (d-2) may be present inside the one domain (d-1). Thus, the polycarbonate-based resin (S) necessarily has a domain (d) in which the at least one domain (d-2) is present inside the domain (d-1).

The matrix in the polycarbonate-based resin (S) is mainly formed of at least one selected from the block derived from the aromatic polycarbonate-based resin (B) and the polycarbonate block (A-1) as long as the ratio of the polyorganosiloxane block (A-2) to the total of the polycarbonate-polyorganosiloxane copolymer (A) and the aromatic polycarbonate-based resin (B) is not more than 50 mass %.

The domain (d-1) containing the polyorganosiloxane block (A-2) is preferably mainly formed of the polyorganosiloxane block (A-2).

The domain (d-2) containing at least one selected from the block derived from the aromatic polycarbonate-based resin (B) and the polycarbonate block (A-1) is preferably mainly formed of at least one selected from the block derived from the aromatic polycarbonate-based resin (B) and the polycarbonate block (A-1), and may be mainly formed of any one of the block derived from the aromatic polycarbonate-based resin (B) and the polycarbonate block (A-1), or may be mainly formed of both the block derived from the aromatic polycarbonate-based resin (B) and the polycarbonate block (A-1).

Which block a detected domain is mainly formed of is judged from the contrast of an image obtained by observation with a scanning probe microscope (SPM). A domain showing contrast comparable to that of the matrix among the detected domains is judged to be mainly formed of at least one selected from the block derived from the aromatic polycarbonate-based resin (B) and the polycarbonate block (A-1). Similarly, a domain showing so dark contrast as to be clearly distinguished from the matrix among the detected domains is judged to be mainly formed of the polyorganosiloxane block (A-2).

In this embodiment, the domain (d-1) containing the polyorganosiloxane block (A-2) is substantially formed of the polyorganosiloxane block (A-2). The domain (d-2) containing at least one selected from the block derived from the aromatic polycarbonate-based resin (B) and the polycarbonate block (A-1) is substantially formed of at least one selected from the block derived from the aromatic polycarbonate-based resin (B) and the polycarbonate block (A-1), and may be substantially formed of any one of the block derived from the aromatic polycarbonate-based resin (B) and the polycarbonate block (A-1), or may be substantially formed of both the block derived from the aromatic polycarbonate-based resin (B) and the polycarbonate block (A-1).

An example of the structure of the polycarbonate-based resin (S) in the polycarbonate-based resin composition of the invention of the present application is described in more detail. The polycarbonate-based resin (S) has a core-shell structure having the domain (d-1) forming a shell in the matrix and the one domain (d-2) forming a core therein. In addition, the resin may have a structure in which the two or more domains (d-2) each having a spherical shape or a cylindrical shape are incorporated inside the one domain (d-1), or a microphase-separated structure, such as a gyroid structure, a lamellar structure, or a salami structure.

When a domain different from the domain (d), the domain being formed only of the domain (d-1) containing the polyorganosiloxane block (A-2) (i.e., the (d-2) is not incorporated inside the (d-1)), is represented by (d'), the ratio of the number of the domains (d) to the total number of the domains (d) and the domains (d') is preferably from 2% or more to 100% or less. When the ratio of the number of the domains (d) falls within the range, more excellent impact resistance can be obtained. The ratio of the number of the domains (d) is more preferably 5% or more, still more preferably 10% or more, still further more preferably 15% or more, still further more preferably 30% or more, particularly preferably 50% or more, and is more preferably 50% or less, still more preferably 45% or less, particularly preferably 30% or less. The numbers of the respective domains (d) and (d') were visually measured with a SPM.

The average sectional area of all domains corresponding to the total of the domains (d) and the domains (d') is preferably 200 nm$^2$ or more. When the average sectional area of all the domains is 200 nm$^2$ or more, more excellent impact resistance can be obtained. In addition, the average sectional area of all the domains corresponding to the total of the domains (d) and the domains (d') is preferably 20,000 nm$^2$ or less. When the average sectional area of all the domains is 20,000 nm$^2$ or less, more excellent impact resistance can be obtained. The average sectional area of all the domains corresponding to the total of the domains (d) and the domains (d') is more preferably 300 nm$^2$ or more, still more preferably 500 nm$^2$ or more, particularly preferably 1,000 nm$^2$ or more, and is more preferably 6,000 nm$^2$ or less, still more preferably 5,000 nm$^2$ or less, still further more preferably 4,000 nm$^2$ or less.

The average sectional area of the respective domains (d) and (d') was calculated by observing the domains with a SPM and processing the resultant image with image analysis software (SPIP). Here, an average sectional area in the case where the domains (d) and (d') each had an opening portion at the time of the observation with the SPM was calculated as described below. In the case where one domain had one opening portion as illustrated in FIG. 1, when a distance between two contact points at the time of the drawing of a tangent of the domain, the tangent having two end portions of the opening portion as the contact points, was ½ or less of the long-axis distance of the domain, the average sectional area was calculated as the average sectional area of the respective domains (d) and domains (d') while the sectional area of the one domain was regarded as the sectional area of a domain free of the opening portion. In addition, in the case where one domain had two or more opening portions (two opening portions in FIG. 2) as illustrated in FIG. 2, when a distance between two contact points of each of the opening portions at the time of the drawing of a tangent of the domain, the tangent having two end portions of the opening portion as the contact points, was ½ or less of the long-axis distance of the domain, the sectional area of the one domain was regarded as the sectional area of a domain free of the respective opening portions. A scanning probe microscope image of a domain having one opening portion is shown in FIG. 3.

The average of distances between the adjacent particles of all the domains corresponding to the total of the domains (d) and the domains (d') in the polycarbonate-based resin (S) is preferably 500 nm or less. When the average of the distances between the adjacent particles of all the domains is 500 nm or less, more excellent impact resistance can be obtained. In addition, the average of the distances between the adjacent particles of all the domains is preferably 50 nm or more. When the average of the distances between the adjacent particles of all the domains is 50 nm or more, more excellent impact resistance can be obtained.

The average of the distances between the adjacent particles of all the domains is more preferably 70 nm or more, still more preferably 110 nm or more, still further more preferably 130 nm or more, particularly preferably 180 nm or more, and is more preferably 350 nm or less, still more preferably 300 nm or less, particularly preferably 200 nm or less. The average of the distances between the adjacent particles of all the domains represents the frequency of presence of all the domains in the matrix. The average of the distances between the adjacent particles of all the domains was calculated by observing the particles with a SPM and processing the resultant image with image analysis software (SPIP).

Detailed conditions for the observation with the scanning probe microscope used in the measurement of the ratio of the number of the domains (d) to the total number of the domains (d) and the domains (d'), the average sectional area of all the domains, and the average of the distances between the adjacent particles of all the domains are described in Examples.

Although a cause for the result that the impact resistance of the polycarbonate-based resin composition of the present invention including the polycarbonate-based resin (S) becomes more excellent without the extension of the chain length of the polyorganosiloxane block or an increase in content thereof is unclear, the following is assumed to be responsible for the result.

That is, in the domain (d) of the polycarbonate-based resin composition according to the present invention, the domain (d-2) containing at least one selected from the block derived from the aromatic polycarbonate-based resin (B) and the polycarbonate block (A-1) is present inside the domain (d-1) containing the polyorganosiloxane block (A-2).

When the amount of the polyorganosiloxane block (A-2) in the polycarbonate-based resin composition is the same as that of the foregoing composition, the domain (d) including the domain (d-2) is increased in size as compared to the domain (d') formed only of the domain (d-1), and hence its size becomes larger than the size of the domain (d'). The size of the domain (d) present in the matrix entirely increases, and hence the propagation of a stress wave at the time of the application of an impact load to the polycarbonate-based resin composition may be further suppressed.

The content of the polyorganosiloxane block (A-2) in the polycarbonate-based resin (S) is preferably 0.1 mass % or more, more preferably 0.4 mass % or more, still more preferably 0.8 mass % or more, still further more preferably 1 mass % or more, particularly preferably 3 mass % or more, and is preferably 10 mass % or less, more preferably 7 mass % or less, still more preferably 6 mass % or less, particularly preferably 5 mass % or less, most preferably 4 mass % or less. When the content of the polyorganosiloxane block (A-2) in the polycarbonate-based resin (S) falls within the range, an excellent impact-resisting characteristic can be obtained.

The viscosity-average molecular weight (Mv) of the polycarbonate-based resin (S) may be appropriately adjusted by using, for example, a molecular weight modifier (terminal stopper) so as to be a target molecular weight in accordance with applications or products in which the polycarbonate-based resin is used. The viscosity-average molecular weight of the polycarbonate-based resin (S) is preferably 9,000 or more, more preferably 12,000 or more, still more preferably 14,000 or more, particularly preferably 16,000 or more, and is preferably 50,000 or less, more preferably 30,000 or less, still more preferably 23,000 or less, particularly preferably 21,000 or less. When the viscosity-average molecular weight is 9,000 or more, a sufficient strength of a molded article can be obtained. When the viscosity-average molecular weight is 50,000 or less, injection molding or extrusion molding can be performed at the temperature at which the heat deterioration of the polycarbonate-based resin does not occur.

The viscosity-average molecular weight (Mv) is a value calculated from the following Schnell's equation by measuring the limiting viscosity [η] of a methylene chloride solution at 20° C.

$$[\eta]=1.23\times10^{-5}\times Mv^{0.83}$$

A polycarbonate-based resin composition according to a third embodiment of the present invention comprises:

50 mass % or more to 99 mass % or less of a polycarbonate-based resin (S) containing a polycarbonate-polyorganosiloxane copolymer (A) containing a polycarbonate block (A-1) formed of a repeating unit represented by the following general formula (I) and a polyorganosiloxane block (A-2) containing a repeating unit represented by the following general formula (II), and an aromatic polycarbonate-based resin (B) except the polycarbonate-polyorganosiloxane copolymer (A); and 1 mass % or more to 50 mass % or less of a polyester-based resin (C), wherein the polycarbonate-based resin composition has a structure in which a domain ($d^c$-1) containing the polyorganosiloxane block (A-2) is present in a matrix containing the aromatic polycarbonate-based resin (B) as a main component, and a domain ($d^c$-2) containing at least one selected from a block derived from the aromatic polycarbonate-based resin (B) and the polycarbonate block (A-1) is present inside the domain ($d^c$-1):

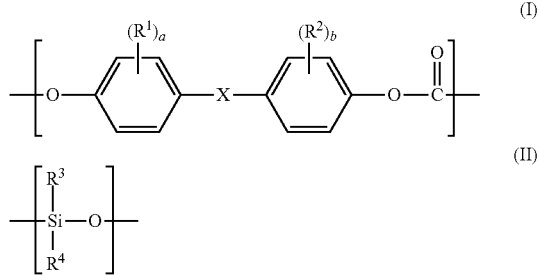

wherein $R^1$, $R^2$, X, $R^3$, $R^4$, "a", and "b" are as described above.

The polycarbonate-based resin composition in the third embodiment of the present invention has the same domain structure as that of the polycarbonate-based resin (S) described in the above-mentioned second embodiment. Which block a detected domain is mainly formed of is judged from the contrast of an image obtained by observation with a scanning probe microscope as in the polycarbonate-based resin (S).

That is, as in the second embodiment, the domain ($d^c$-1) corresponding to the domain (d-1) is present in the matrix containing the aromatic polycarbonate-based resin (B) component as a main component, and the domain ($d^c$-2) corresponding to the domain (d-2) is present inside the domain ($d^c$-1). Only the one domain ($d^c$-2) may be present inside the one domain ($d^c$-1), or the two or more domains ($d^c$-2) may be present inside the one domain ($d^c$-1). Thus, the polycarbonate-based resin composition necessarily has the domain ($d^c$) in which the at least one domain ($d^c$-2) is present inside the domain ($d^c$-1).

In the same manner as described above, the matrix in the polycarbonate-based resin composition is mainly formed of at least one selected from the block derived from the aromatic polycarbonate-based resin (B) and the polycarbonate block (A-1) as long as the ratio of the polyorganosiloxane block (A-2) to the total of the polycarbonate-polyorganosiloxane copolymer (A) and the aromatic polycarbonate-based resin (B) serving as resin components is not more than 50 mass %.

Resin components forming the domain ($d^c$-1) and the domain ($d^c$-2) are the same as those of the domain (d-1) and the domain (d-2). In addition, as in the polycarbonate-based resin (S), the polycarbonate-based resin composition has a core-shell structure having the domain ($d^c$-1) forming a shell in the matrix and the one domain ($d^c$-2) forming a core therein. In addition, the composition may have a structure in which the two or more domains ($d^c$-2) each having a spherical shape or a cylindrical shape are incorporated inside the one domain ($d^c$-1), or a microphase-separated structure, such as a gyroid structure, a lamellar structure, or a salami structure.

In the second embodiment, when a domain free of the domain ($d^c$-2) inside the domain ($d^c$-1) (i.e., corresponding to the domain (d') in the first embodiment) is represented by ($d'^c$), the ratio of the number of the domains ($d^c$) to the total number of the domains ($d^c$) and the domains ($d'^c$) is preferably from 2% or more to 100% or less. When the ratio of the number of the domains ($d^c$) falls within the range, more excellent impact resistance can be obtained. The ratio of the number of the domains ($d^c$) is more preferably 5% or more, still more preferably 10% or more, still further more preferably 15% or more, still further more preferably 20% or more, still further more preferably 30% or more, particularly preferably 50% or more, and is more preferably 90% or less, still more preferably 85% or less, still further more preferably 80% or less, still further more preferably 50% or less, still further more preferably 45% or less, particularly preferably 30% or less. The numbers of the respective domains ($d^c$) and ($d'^c$) were visually measured with a SPM.

The average sectional area of all domains corresponding to the total of the domains ($d^c$) and the domains ($d'^c$) is preferably 200 nm$^2$ or more. When the average sectional area of all the domains is 200 nm$^2$ or more, more excellent impact resistance can be obtained. In addition, the average sectional area of all the domains corresponding to the total of the domains ($d^c$) and the domains ($d'^c$) is preferably 20,000 nm$^2$ or less. When the average sectional area of all the domains is 20,000 nm$^2$ or less, more excellent impact resistance can be obtained. The average sectional area of all the domains corresponding to the total of the domains (d) and the domains (d') is more preferably 300 nm$^2$ or more, still more preferably 500 nm$^2$ or more, particularly preferably 1,000 nm$^2$ or more, and is more preferably 10,000 nm$^2$ or less, still more preferably 6,000 nm$^2$ or less, still further more preferably 5,000 nm$^2$ or less, still further more preferably 4,000 nm$^2$ or less, particularly preferably 3,000 nm$^2$ or less.

As in the above-mentioned second embodiment, the average sectional area of the respective domains ($d^c$) and ($d'^c$) was calculated by observing the domains with a SPM and processing the resultant image with image analysis software (SPIP). A method of calculating the average sectional area and a method of judging the presence or absence of an opening portion are as described in the first embodiment.

The average of distances between the adjacent particles of all the domains corresponding to the total of the domains ($d^c$) and the domains ($d'^c$) in the polycarbonate-based resin composition is preferably 500 nm or less. When the average of the distances between the adjacent particles of all the domains is 500 nm or less, more excellent impact resistance can be obtained. In addition, the average of the distances between the adjacent particles of all the domains is preferably 50 nm or more. When the average of the distances between the adjacent particles of all the domains is 50 nm or more, more excellent impact resistance can be obtained.

The average of the distances between the adjacent particles of all the domains is more preferably 55 nm or more, still more preferably 60 nm or more, still further more preferably 70 nm or more, still further more preferably 110 nm or more, still further more preferably 130 nm or more, particularly preferably 180 nm or more, and is more preferably 350 nm or less, still more preferably 300 nm or less, particularly preferably 200 nm or less. As in the first embodiment, the average of the distances between the adjacent particles of all the domains represents the frequency of presence of all the domains in the matrix. The average of the distances between the adjacent particles of all the domains was calculated by observing the particles with a SPM and processing the resultant image with image analysis software (SPIP).

Detailed conditions for the observation with the scanning probe microscope used in the measurement of the ratio of the number of the domains ($d^c$) to the total number of the domains ($d^c$) and the domains ($d'^c$), the average sectional area of all the domains, and the average of the distances between the adjacent particles of all the domains are described in Examples.

<Polycarbonate-Polyorganosiloxane Copolymer (A)>

The respective components in the first, second, and third embodiments are described in more detail below.

The polycarbonate-polyorganosiloxane copolymer (A) in the first embodiment of the present invention is required to satisfy the following conditions: the copolymer contains the polycarbonate block (A-1) formed of a repeating unit represented by the following general formula (I) and the polyorganosiloxane block (A-2) containing a repeating unit represented by the following general formula (II), and the polyorganosiloxane block (A-2) has an average chain length of from 50 or more to 500 or less.

In the second embodiment and third embodiment of the present invention, the above-mentioned domain (d-1) contains the following polyorganosiloxane block (A-2) of the polycarbonate-polyorganosiloxane copolymer (A), and is preferably mainly formed of the polyorganosiloxane block (A-2). As described above, the polycarbonate-polyorganosiloxane copolymer (A) contains the polycarbonate block (A-1) formed of a repeating unit represented by the following general formula (I) and the polyorganosiloxane block (A-2) containing a repeating unit represented by the following general formula (II):

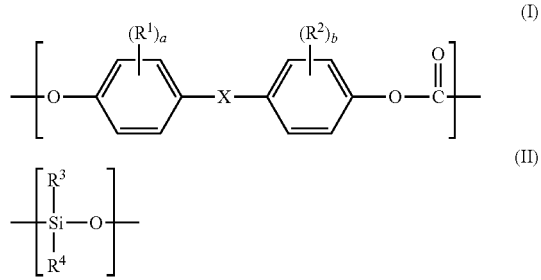

wherein
in the general formulae (I) and (II), $R^1$ to $R^4$, X, "a", and "b" are as described above.

In the general formula (I), examples of the halogen atom that $R^1$ and $R^2$ each independently represent include a fluorine atom, a chlorine atom, a bromine atom, and an iodine atom.

Examples of the alkyl group that $R^1$ and $R^2$ each independently represent include a methyl group, an ethyl group, a n-propyl group, an isopropyl group, various butyl groups (the term "various" means that a linear group and all kinds of branched groups are included, and in this description, the same holds true for the following), various pentyl groups, and various hexyl groups. Examples of the alkoxy group that $R^1$ and $R^2$ each independently represent include alkoxy groups having the above-mentioned alkyl groups as alkyl group moieties.

Examples of the alkylene group represented by X include a methylene group, an ethylene group, a trimethylene group, a tetramethylene group, and a hexamethylene group. Among them, an alkylene group having 1 to 5 carbon atoms is preferred. Examples of the alkylidene group represented by X include an ethylidene group and an isopropylidene group. Examples of the cycloalkylene group represented by X include a cyclopentanediyl group, a cyclohexanediyl group, and a cyclooctanediyl group. Among them, a cycloalkylene group having 5 to 10 carbon atoms is preferred. Examples of the cycloalkylidene group represented by X include a cyclohexylidene group, a 3,5,5-trimethylcyclohexylidene group, and a 2-adamantylidene group. Among them, a cycloal- kylidene group having 5 to 10 carbon atoms is preferred, and a cycloalkylidene group having 5 to 8 carbon atoms is more preferred. Examples of the aryl moiety of the arylalkylene group represented by X include aryl groups each having 6 to 14 ring-forming carbon atoms, such as a phenyl group, a naphthyl group, a biphenyl group, and an anthryl group, and examples of the alkylene group include the above-mentioned alkylene groups. Examples of the aryl moiety of the arylalkylidene group represented by X include aryl groups each having 6 to 14 ring-forming carbon atoms, such as a phenyl group, a naphthyl group, a biphenyl group, and an anthryl group, and examples of the alkylidene group may include the above-mentioned alkylidene groups.

"a" and "b" each independently represent an integer of from 0 to 4, preferably from 0 to 2, more preferably 0 or 1.

Among them, a repeating unit in which "a" and "b" each represent 0, and X represents a single bond or an alkylene group having 1 to 8 carbon atoms, or a repeating unit in which "a" and "b" each represent 0, and X represents an alkylene group having 3 carbon atoms, in particular an isopropylidene group is suitable.

In the general formula (II), examples of the halogen atom represented by $R^3$ or $R^4$ include a fluorine atom, a chlorine atom, a bromine atom, and an iodine atom. Examples of the alkyl group represented by $R^3$ or $R^4$ include a methyl group, an ethyl group, a n-propyl group, an isopropyl group, various butyl groups, various pentyl groups, and various hexyl groups. Examples of the alkoxy group represented by $R^3$ or $R^4$ include alkoxy groups having the above-mentioned alkyl groups as alkyl group moieties. Examples of the aryl group represented by $R^3$ or $R^4$ include a phenyl group and a naphthyl group.

$R^3$ and $R^4$ each preferably represent a hydrogen atom, an alkyl group having 1 to 6 carbon atoms, an alkoxy group having 1 to 6 carbon atoms, or an aryl group having 6 to 12 carbon atoms, and each more preferably represent a methyl group.

More specifically, the polyorganosiloxane block (A-2) containing the repeating unit represented by the general formula (II) preferably has a unit represented by any one of the following general formulae (II-I) to (II-III):

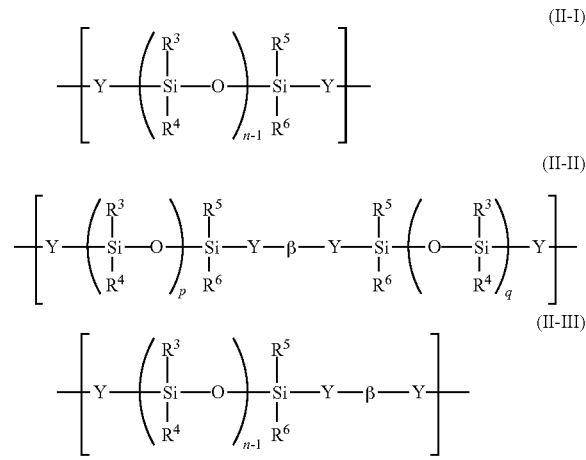

wherein $R^3$ to $R^6$ each independently represent a hydrogen atom, a halogen atom, an alkyl group having 1 to 6 carbon atoms, an alkoxy group having 1 to 6 carbon atoms, or an aryl group having 6 to 12 carbon atoms, and a plurality of $R^3$s, $R^4$s, $R^5$s, or $R^6$s may be identical to or different from each other, Y represents —R$^7$O—, —R$^7$COO—, —R$^7$NH—, —R$^7$NR$^8$—, —COO—, —S—, —R$^7$COO—R$^9$—O—, or —R$^7$O—R$^{10}$—O—, and a plurality of Y may be identical to or different from each other, the R$^7$ represents a single bond, a linear, branched, or cyclic alkylene group, an aryl-substituted alkylene group, a substituted or unsubstituted arylene group, or a diarylene group, R$^8$ represents an alkyl group, an alkenyl group, an aryl group, or an aralkyl group, R$^9$ represents a diarylene group, R$^{10}$ represents a linear, branched, or cyclic alkylene group, or a diarylene group, β represents a divalent group derived from a diisocyanate compound, or a divalent group derived from a dicarboxylic acid or a halide of a dicarboxylic acid, "n" represents the chain length of the polyorganosiloxane, and n−1, and "p" and "q" each represent the number of repetitions of a polyorganosiloxane unit and each represent an integer of 1 or more, and the sum of "p" and "q" is n−2.

Examples of the halogen atom that R$^3$ to R$^6$ each independently represent include a fluorine atom, a chlorine atom, a bromine atom, and an iodine atom. Examples of the alkyl group that R$^3$ to R$^6$ each independently represent include a methyl group, an ethyl group, a n-propyl group, an isopropyl group, various butyl groups, various pentyl groups, and various hexyl groups. Examples of the alkoxy group that R$^3$ to R$^6$ each independently represent include alkoxy groups having the above-mentioned alkyl groups as alkyl group moieties. Examples of the aryl group that R$^3$ to R$^6$ each independently represent include a phenyl group and a naphthyl group.

R$^3$ to R$^6$ each preferably represent a hydrogen atom, an alkyl group having 1 to 6 carbon atoms, an alkoxy group having 1 to 6 carbon atoms, or an aryl group having 6 to 12 carbon atoms.

R$^3$ to R$^6$ in the general formula (II-I), the general formula (II-II), and/or the general formula (II-III) each preferably represent a methyl group.

The linear or branched alkylene group represented by R$^7$ in —R$^7$O—, —R$^7$COO—, —R$^7$NH—, —R$^7$NR$^8$—, —R$^7$COO—R$^9$—O—, or R$^7$O—R$^{10}$—O— represented by Y is, for example, an alkylene group having 1 to 8 carbon atoms, preferably 1 to 5 carbon atoms, and the cyclic alkylene group represented by R$^7$ is, for example, a cycloalkylene group having 5 to 15 carbon atoms, preferably 5 to 10 carbon atoms.

The aryl-substituted alkylene group represented by R$^7$ may have a substituent, such as an alkoxy group or an alkyl group, on its aromatic ring, and a specific structure thereof may be, for example, a structure represented by the following general formula (i) or (ii). When the block has the aryl-substituted alkylene group, the alkylene group is bonded to Si.

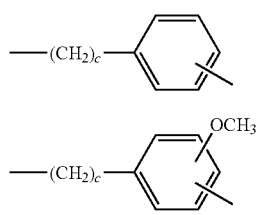

wherein "c" represents a positive integer and typically represents an integer of from 1 to 6.

The diarylene group represented by any one of R$^7$, R$^9$, and R$^{10}$ refers to a group in which two arylene groups are linked to each other directly or through a divalent organic group, and is specifically a group having a structure represented by —Ar$^1$—W—Ar$^2$—. Here, Ar$^1$ and Ar$^2$ each represent an arylene group, and W represents a single bond or a divalent organic group. Examples of the divalent organic group represented by W include an isopropylidene group, a methylene group, a dimethylene group, and a trimethylene group.

Examples of the arylene group represented by any one of R$^7$, Ar$^1$, and Ar$^2$ include arylene groups each having 6 to 14 ring-forming carbon atoms, such as a phenylene group, a naphthylene group, a biphenylene group, and an anthrylene group. Those arylene groups may each have an arbitrary substituent, such as an alkoxy group or an alkyl group.

The alkyl group represented by R$^8$ is a linear or branched group having 1 to 8, preferably 1 to 5 carbon atoms. The alkenyl group represented by R$^8$ is, for example, a linear or branched group having 2 to 8, preferably 2 to 5 carbon atoms. The aryl group represented by R$^8$ is, for example, a phenyl group or a naphthyl group. The aralkyl group represented by R$^8$ is, for example, a phenylmethyl group or a phenylethyl group.

The linear, branched, or cyclic alkylene group represented by R$^{10}$ is the same as that represented by R$^7$.

Y preferably represents —R$^7$O—. R$^7$ preferably represents an aryl-substituted alkylene group, in particular a residue of a phenol-based compound having an alkyl group, and more preferably represents an organic residue derived from allylphenol or an organic residue derived from eugenol.

With regard to "p" and "q" in the formula (II-II), it is preferred that p=q.

β represents a divalent group derived from a diisocyanate compound, or a divalent group derived from a dicarboxylic acid or a halide of a dicarboxylic acid, and examples thereof include divalent groups represented by the following general formulae (iii) to (vii).

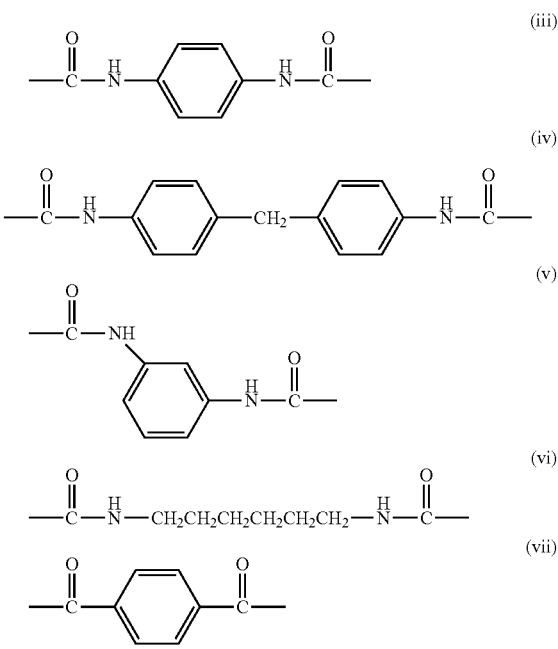

In the first embodiment of the present invention, the average chain length "n" of the polyorganosiloxane block (A-2) in the PC-POS copolymer (A) needs to be from 50 or more to 500 or less. In the first embodiment of the present invention, when the average chain length falls within the range, excellent impact resistance and excellent chemical resistance can be obtained at the time of the production of a resin composition including the copolymer and the polyester-based resin (C). In the first embodiment, the average chain length of the polyorganosiloxane block (A-2) is preferably 55 or more, more preferably 60 or more, still more preferably 80 or more, particularly preferably 90 or more, and is preferably 450 or less, more preferably 400 or less, still more preferably 300 or less, particularly preferably 200 or less.

In the second embodiment and third embodiment of the present invention, the average chain length "n" of the polyorganosiloxane block (A-2) in the PC-POS copolymer (A) is preferably 30 or more, more preferably 35 or more, still more preferably 40 or more, still further more preferably 50 or more, particularly preferably 55 or more, most preferably 60 or more. In addition, the average chain length is preferably 500 or less, more preferably 400 or less, still more preferably 300 or less, still further more preferably 200 or less, particularly preferably 120 or less, most preferably 85 or less. When the average chain length "n" falls within the range of from 30 or more to 500 or less, more excellent impact resistance can be obtained. In addition, the average chain length "n" of the polyorganosiloxane block (A-2) preferably falls within the range of from 55 or more to 500 or less from the viewpoint that more excellent impact resistance and more excellent chemical resistance are obtained.

The average chain length of the polyorganosiloxane is calculated by nuclear magnetic resonance (NMR) measurement.

The content of the polyorganosiloxane block (A-2) in the PC-POS copolymer (A) is preferably 5 mass % or more, more preferably 6 mass % or more, still more preferably 10 mass % or more, still furthermore preferably 14 mass % or more, still further more preferably 18 mass % or more, particularly preferably 21 mass % or more. In addition, the content is preferably 70 mass % or less, more preferably 50 mass % or less, still more preferably 45 mass % or less, particularly preferably 40 mass % or less. When the content of the polyorganosiloxane block in the PC-POS copolymer (A) falls within the range, more excellent impact resistance can be obtained.

The viscosity-average molecular weight (Mv) of the PC-POS copolymer (A) may be appropriately adjusted by using, for example, a molecular weight modifier (terminal stopper) so as to be a target molecular weight in accordance with applications or products in which the copolymer is used. However, the viscosity-average molecular weight is preferably 9,000 or more, more preferably 12,000 or more, still more preferably 14,000 or more, particularly preferably 16,000 or more, and is preferably 50,000 or less, more preferably 30,000 or less, still more preferably 23,000 or less, particularly preferably 22,000 or less, most preferably 20,000 or less. When the viscosity-average molecular weight is 9,000 or more, a sufficient strength of a molded article can be obtained. When the viscosity-average molecular weight is 50,000 or less, injection molding or extrusion molding can be performed at the temperature at which the heat deterioration of the copolymer does not occur.

The viscosity-average molecular weight (Mv) is a value calculated from the following Schnell's equation by measuring the limiting viscosity [η] of a methylene chloride solution at 20° C.

[η]=1.23×10⁻⁵×$Mv^{0.83}$

The polycarbonate-polyorganosiloxane copolymer (A) may be produced by a known production method, such as an interfacial polymerization method (phosgene method), a pyridine method, or an ester exchange method. Particularly in the case of the interfacial polymerization method, a step of separating an organic phase containing the PC-POS copolymer (A) and an aqueous phase containing an unreacted product, a catalyst residue, or the like becomes easier, and hence the separation of the organic phase containing the PC-POS copolymer (A) and the aqueous phase in each washing step based on alkali washing, acid washing, or pure water washing becomes easier. Accordingly, the PC-POS copolymer (A) is efficiently obtained. With regard to a method of producing the PC-POS copolymer (A), reference may be made to, for example, a method described in JP 2010-241943 A.

Specifically, the PC-POS copolymer (A) may be produced by: dissolving a polycarbonate oligomer produced in advance to be described later and a polyorganosiloxane in a water-insoluble organic solvent (e.g., methylene chloride); adding a solution of a dihydric phenol-based compound (e.g., bisphenol A) in an aqueous alkali compound (e.g., aqueous sodium hydroxide) to the solution; and subjecting the mixture to an interfacial polycondensation reaction through the use of a tertiary amine (e.g., triethylamine) or a quaternary ammonium salt (e.g., trimethylbenzylammonium chloride) as a polymerization catalyst in the presence of a terminal stopper (a monohydric phenol, such as p-tert-butylphenol). In addition, the PC-POS copolymer (A) may also be produced by copolymerizing the polyorganosiloxane and a dihydric phenol, and phosgene, a carbonate ester, or a chloroformate.

When the polycarbonate-polyorganosiloxane copolymer (A) in the polycarbonate-based resin composition of the present application is produced by, for example, causing the polycarbonate oligomer and a polyorganosiloxane raw material to react with each other in an organic solvent, and then causing the resultant to react with the dihydric phenol, the solid content weight (g/L) of the polycarbonate oligomer in 1 L of a mixed solution of the organic solvent and the polycarbonate oligomer preferably falls within the range of from 80 g/L or more to 200 g/L or less. The solid content weight is more preferably 90 g/L or more, still more preferably 100 g/L or more, and is more preferably 180 g/L or less, still more preferably 170 g/L or less.

A polyorganosiloxane represented by the following general formula (1), general formula (2), and/or general formula (3) may be used as the polyorganosiloxane serving as a raw material:

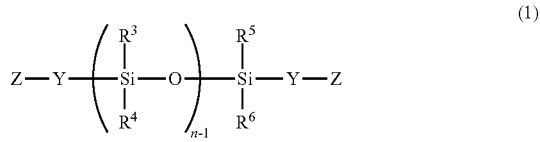

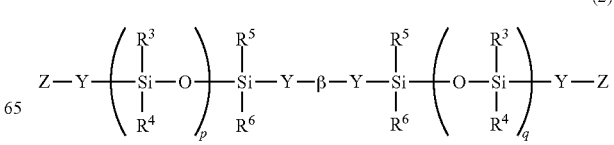

-continued

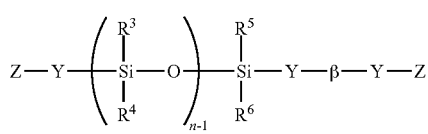
(3)

wherein
R³ to R⁶, Y, β, n−1, "p", and "q" are as described above, and specific examples and preferred examples thereof are also the same as those described above, and Z represents a hydrogen atom or a halogen atom, and a plurality of Z may be identical to or different from each other.

Examples of the polyorganosiloxane represented by the general formula (1) include compounds each represented by any one of the following general formulae (1-1) to (1-11):

(1-1)
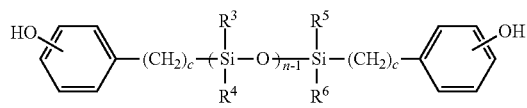

(1-2)
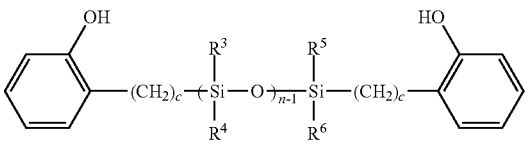

(1-3)
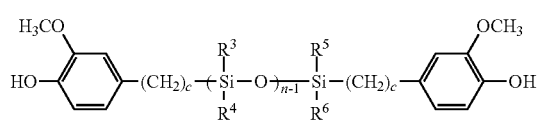

(1-4)

(1-5)
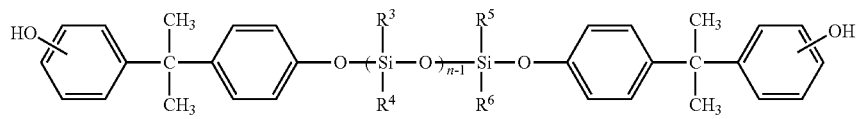

(1-6)
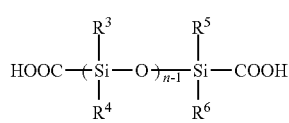

(1-7)
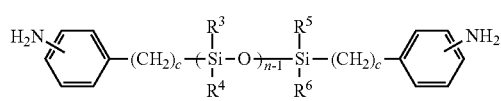 (1-6)
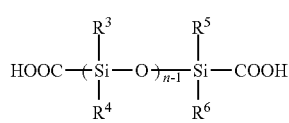

(1-7)
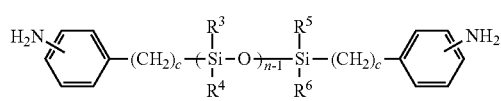

(1-8)
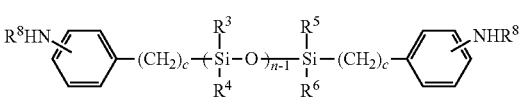

(1-9)

(1-10)
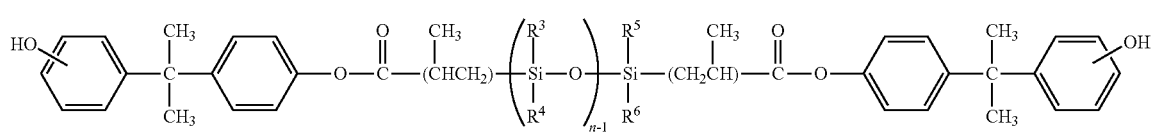

(1-11)
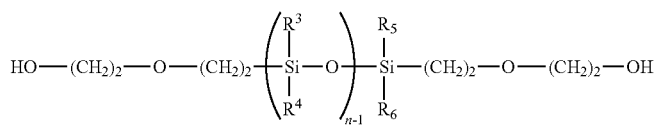

wherein in the general formulae (1-1) to (1-11), R³ to R⁶, "n", and R⁸ are as defined above, and preferred examples thereof are also the same as those described above, and "c" represents a positive integer and typically represents an integer of from 1 to 6.

Among them, a phenol-modified polyorganosiloxane represented by the general formula (1-1) is preferred from the viewpoint of its ease of polymerization. In addition, an α,ω-bis[3-(o-hydroxyphenyl) propyl]polydimethylsiloxane, which is one compound represented by the general formula (1-2), or an α,ω-bis[3-(4-hydroxy-3-methoxyphenyl)propyl]polydimethylsiloxane, which is one compound represented by the general formula (1-3), is preferred from the viewpoint of its ease of availability.

In addition to the foregoing, a compound having a structure represented by the following general formula (4) may be used as a polyorganosiloxane raw material:

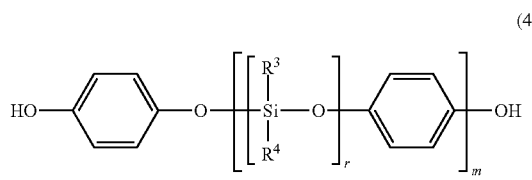
(4)

wherein $R^3$ and $R^4$ are identical to those described above. The average chain length of the polyorganosiloxane block represented by the general formula (4) is (r×m), and the range of the (r×m) is the same as that of the "n".

When the compound represented by the general formula (4) is used as a polyorganosiloxane raw material, the polyorganosiloxane block (A-2) preferably has a unit represented by the following general formula (II-IV):

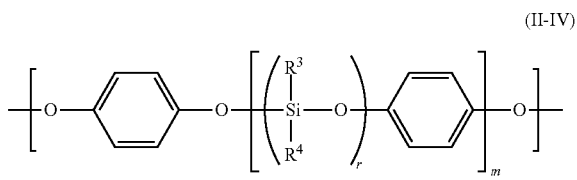
(II-IV)

wherein $R^3$, $R^4$, "r", and "m" are as described above.

The copolymer may include a structure represented by the following general formula (II-V) as the polyorganosiloxane block (A-2):

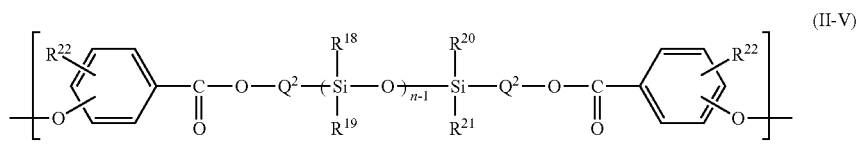
(II-V)

wherein $R^{18}$ to $R^{21}$ each independently represent a hydrogen atom or an alkyl group having 1 to 13 carbon atoms, $R^{22}$ represents an alkyl group having 1 to 6 carbon atoms, a hydrogen atom, a halogen atom, a hydroxy group, an alkoxy group having 1 to 6 carbon atoms, or an aryl group having 6 to 14 carbon atoms, $Q^2$ represents a divalent aliphatic group having 1 to 10 carbon atoms, and "n" represents an average chain length and represents from 30 to 70.

In the general formula (II-V), examples of the alkyl group having 1 to 13 carbon atoms that $R^{18}$ to $R^{21}$ each independently represent include a methyl group, an ethyl group, a n-propyl group, an isopropyl group, various butyl groups, various pentyl groups, various hexyl groups, various heptyl groups, various octyl groups, a 2-ethylhexyl group, various nonyl groups, various decyl groups, various undecyl groups, various dodecyl groups, and various tridecyl groups. Among them, $R^{18}$ to $R^{21}$ each preferably represent a hydrogen atom or an alkyl group having 1 to 6 carbon atoms, and it is more preferred that all of $R^{18}$ to $R^{21}$ each represent a methyl group.

Examples of the alkyl group having 1 to 6 carbon atoms represented by $R^{22}$ include a methyl group, an ethyl group, a n-propyl group, an isopropyl group, various butyl groups, various pentyl groups, and various hexyl groups. Examples of the halogen atom represented by $R^{22}$ include a fluorine atom, a chlorine atom, a bromine atom, and an iodine atom. An example of the alkoxy group having 1 to 6 carbon atoms represented by $R^{22}$ is an alkoxy group whose alkyl group moiety is the alkyl group described above. In addition, examples of the aryl group having 6 to 14 carbon atoms represented by $R^{22}$ include a phenyl group, a toluyl group, a dimethylphenyl group, and a naphthyl group.

Among them, $R^{22}$ preferably represents a hydrogen atom or an alkoxy group having 1 to 6 carbon atoms, more preferably represents a hydrogen atom or an alkoxy group having 1 to 3 carbon atoms, and still more preferably represents a hydrogen atom.

The divalent aliphatic group having 1 to 10 carbon atoms represented by $Q^2$ is preferably a linear or branched divalent saturated aliphatic group having 1 to 10 carbon atoms. The number of carbon atoms of the saturated aliphatic group is preferably from 1 to 8, more preferably from 2 to 6, still more preferably from 3 to 6, still further more preferably from 4 to 6. The average chain length "n" is as described above.

A preferred mode of the constituent unit (II-V) may be, for example, a structure represented by the following general formula (II-VI):

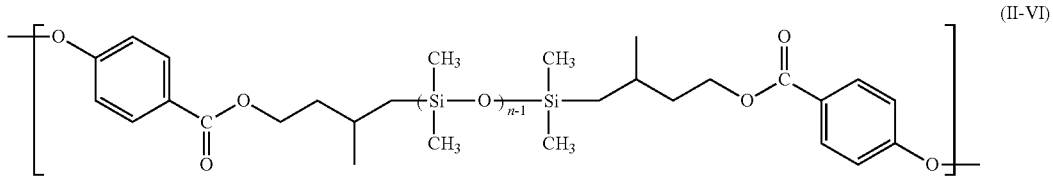

wherein "n" is identical to that described above.

The polyorganosiloxane block (A-2) represented by the general formula (II-V) or (II-VI) may be obtained by using a polyorganosiloxane raw material represented by the following general formula (5) or (6):

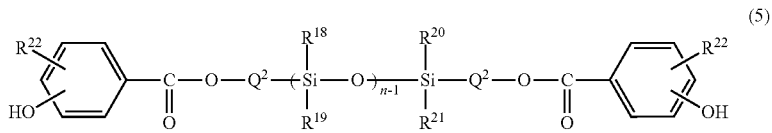

wherein $R^{18}$ to $R^{22}$, $Q^2$, and "n" are as described above;

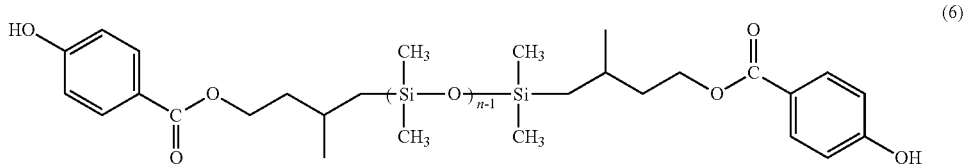

wherein "n" is as described above.

A method of producing the polyorganosiloxane is not particularly limited. According to, for example, a method described in JP 11-217390 A, a crude polyorganosiloxane may be obtained by: causing cyclotrisiloxane and disiloxane to react with each other in the presence of an acid catalyst to synthesize α,ω-dihydrogen organopentasiloxane; and then subjecting the α,ω-dihydrogen organopentasiloxane to an addition reaction with, for example, a phenolic compound (e.g., 2-allylphenol, 4-allylphenol, eugenol, or 2-propenylphenol) in the presence of a catalyst for a hydrosilylation reaction. In addition, according to a method described in JP 2662310 B2, the crude polyorganosiloxane may be obtained by: causing octamethylcyclotetrasiloxane and tetramethyldisiloxane to react with each other in the presence of sulfuric acid (acid catalyst); and subjecting the resultant α,ω-dihydrogen organopolysiloxane to an addition reaction with the phenolic compound or the like in the presence of the catalyst for a hydrosilylation reaction in the same manner as that described above. The α,ω-dihydrogen organopolysiloxane may be used after its chain length "n" has been appropriately adjusted in accordance with its polymerization conditions, or a commercial α,ω-dihydrogen organopolysiloxane may be used.

Examples of the catalyst for a hydrosilylation reaction include transition metal-based catalysts. Among them, a platinum-based catalyst is preferably used in terms of a reaction rate and selectivity. Specific examples of the platinum-based catalyst include chloroplatinic acid, an alcohol solution of chloroplatinic acid, an olefin complex of platinum, a complex of platinum and a vinyl group-containing siloxane, platinum-supported silica, and platinum-supported activated carbon.

The crude polyorganosiloxane is preferably brought into contact with an adsorbent to cause the adsorbent to adsorb and remove a transition metal derived from a transition metal-based catalyst in the crude polyorganosiloxane, the catalyst having been used as the catalyst for a hydrosilylation reaction.

An adsorbent having an average pore diameter of, for example, 1,000 Å or less may be used as the adsorbent. When the average pore diameter is 1,000 Å or less, the transition metal in the crude polyorganosiloxane can be efficiently removed. From such viewpoint, the average pore diameter of the adsorbent is preferably 500 Å or less, more preferably 200 Å or less, still more preferably 150 Å or less, still further more preferably 100 Å or less. In addition, from the same viewpoint, the adsorbent is preferably a porous adsorbent.

Although the adsorbent is not particularly limited as long as the adsorbent has the above-mentioned average pore diameter, for example, activated clay, acid clay, activated carbon, synthetic zeolite, natural zeolite, activated alumina, silica, a silica-magnesia-based adsorbent, diatomaceous earth, or cellulose may be used, and at least one selected from the group consisting of activated clay, acid clay, activated carbon, synthetic zeolite, natural zeolite, activated alumina, silica, and a silica-magnesia-based adsorbent is preferred.

After the adsorbent has been caused to adsorb the transition metal in the crude polyorganosiloxane, the adsorbent may be separated from the polyorganosiloxane by arbitrary separating means. Examples of the means for separating the adsorbent from the polyorganosiloxane include a filter and centrifugal separation. When the filter is used, a filter such as a membrane filter, a sintered metal filter, or a glass fiber filter may be used. Among them, a membrane filter is particularly preferably used.

The average particle diameter of the adsorbent is typically from 1 μm or more to 4 mm or less, preferably from 1 μm or more to 100 μm or less from the viewpoint that the adsorbent is separated from the polyorganosiloxane after the adsorption of the transition metal.

When the adsorbent is used, its usage amount is not particularly limited. The porous adsorbent may be used in an amount in the range of preferably from 1 part by mass or more to 30 parts by mass or less, more preferably from 2 parts by mass or more to 20 parts by mass or less with respect to 100 parts by mass of the crude polyorganosiloxane.

When the crude polyorganosiloxane to be treated has so high a molecular weight that the polyorganosiloxane is not in a liquid state, the polyorganosiloxane may be heated to such a temperature as to be in a liquid state at the time of the performance of the adsorption with the adsorbent and the separation of the adsorbent. Alternatively, the adsorption and the separation may be performed after the polyorganosiloxane has been dissolved in a solvent, such as methylene chloride or hexane.

A polyorganosiloxane having a desired molecular weight distribution is obtained by regulating its molecular weight distribution through, for example, the blending of a plurality of polyorganosiloxanes. With regard to the blending, a crude polyorganosiloxane having a desired molecular weight distribution may be obtained by blending a plurality of α,ω-dihydrogen organopolysiloxanes and then subjecting a phenolic compound or the like to an addition reaction with the resultant in the presence of a catalyst for a hydrosilylation reaction. In addition, purification, such as the removal of the catalyst for a hydrosilylation reaction, may be performed after a plurality of crude polyorganosiloxanes have been blended. A plurality of polyorganosiloxanes after the purification may be blended. In addition, a molecular weight distribution may be appropriately adjusted depending on a polymerization condition at the time of the production of a polyorganosiloxane. In addition, a desired molecular weight distribution may be obtained by fractionating only part of existing polyorganosiloxanes through means such as various kinds of separation.

The polycarbonate oligomer may be produced by a reaction between a dihydric phenol and a carbonate precursor, such as phosgene or triphosgene, in an organic solvent, such as methylene chloride, chlorobenzene, or chloroform. When the polycarbonate oligomer is produced by using an ester exchange method, the oligomer may be produced by a reaction between the dihydric phenol and a carbonate precursor, such as diphenyl carbonate.

A dihydric phenol represented by the following general formula (viii) is preferably used as the dihydric phenol:

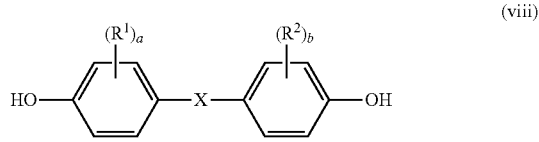

(viii)

wherein $R^1$, $R^2$, "a", "b", and X are as described above.

Examples of the dihydric phenol represented by the general formula (viii) include: bis(hydroxyphenyl)alkane-based dihydric phenols, such as 2,2-bis(4-hydroxyphenyl)propane [bisphenol A], bis(4-hydroxyphenyl)methane, 1,1-bis(4-hydroxyphenyl)ethane, and 2,2-bis(4-hydroxy-3,5-dimethylphenyl)propane; 4,4'-dihydroxydiphenyl; bis(4-hydroxyphenyl)cycloalkanes; bis(4-hydroxyphenyl) oxide; bis(4-hydroxyphenyl) sulfide; bis(4-hydroxyphenyl) sulfone; bis(4-hydroxyphenyl) sulfoxide; and bis(4-hydroxyphenyl) ketone. Those dihydric phenols may be used alone or as a mixture thereof.

Among them, bis(hydroxyphenyl)alkane-based dihydric phenols are preferred, and bisphenol A is more preferred. When bisphenol A is used as the dihydric phenol, the PC-POS copolymer is such that in the general formula (i), X represents an isopropylidene group and a=b=0.

Examples of the dihydric phenol except bisphenol A include bis(hydroxyaryl)alkanes, bis(hydroxyaryl)cycloalkanes, dihydroxyaryl ethers, dihydroxydiaryl sulfides, dihydroxydiaryl sulfoxides, dihydroxydiaryl sulfones, dihydroxydiphenyls, dihydroxydiarylfluorenes, and dihydroxydiaryl adamantanes. Those dihydric phenols may be used alone or as a mixture thereof.

Examples of the bis(hydroxyaryl)alkanes include bis(4-hydroxyphenyl)methane, 1,1-bis(4-hydroxyphenyl)ethane, 2,2-bis(4-hydroxyphenyl)butane, 2,2-bis(4-hydroxyphenyl) octane, bis(4-hydroxyphenyl)phenylmethane, bis(4-hydroxyphenyl)diphenylmethane, 2,2-bis(4-hydroxy-3-methylphenyl)propane, bis(4-hydroxyphenyl)naphthylmethane, 1,1-bis(4-hydroxy-3-tert-butylphenyl)propane, 2,2-bis(4-hydroxy-3-bromophenyl)propane, 2,2-bis(4-hydroxy-3,5-dimethylphenyl)propane, 2,2-bis(4-hydroxy-3-chlorophenyl)propane, 2,2-bis(4-hydroxy-3,5-dichlorophenyl) propane, and 2,2-bis(4-hydroxy-3,5-dibromophenyl) propane.

Examples of the bis(hydroxyaryl)cycloalkanes include 1,1-bis(4-hydroxyphenyl)cyclopentane, 1,1-bis(4-hydroxyphenyl)cyclohexane, 1,1-bis(4-hydroxyphenyl)-3,5,5-trimethylcyclohexane, 2,2-bis(4-hydroxyphenyl)norbornane, and 1,1-bis(4-hydroxyphenyl)cyclododecane. Examples of the dihydroxyaryl ethers include 4,4'-dihydroxydiphenyl ether and 4,4'-dihydroxy-3,3'-dimethylphenyl ether.

Examples of the dihydroxydiaryl sulfides include 4,4'-dihydroxydiphenyl sulfide and 4,4'-dihydroxy-3,3'-dimethyldiphenyl sulfide. Examples of the dihydroxydiaryl sulfoxides include 4,4'-dihydroxydiphenyl sulfoxide and 4,4'-dihydroxy-3,3'-dimethyldiphenyl sulfoxide. Examples of the dihydroxydiaryl sulfones include 4,4'-dihydroxydiphenyl sulfone and 4,4'-dihydroxy-3,3'-dimethyldiphenyl sulfone.

An example of the dihydroxydiphenyls is 4,4'-dihydroxydiphenyl. Examples of the dihydroxydiarylfluorenes include 9,9-bis(4-hydroxyphenyl)fluorene and 9,9-bis(4-hydroxy-3-methylphenyl)fluorene. Examples of the dihydroxydiaryladamantanes include 1,3-bis(4-hydroxyphenyl)adamantane, 2,2-bis(4-hydroxyphenyl)adamantane, and 1,3-bis(4-hydroxyphenyl)-5,7-dimethyladamantane.

Examples of dihydric phenols except those described above include 4,4'-[1,3-phenylenebis(1-methylethylidene)] bisphenol, 10,10-bis(4-hydroxyphenyl)-9-anthrone, and 1,5-bis(4-hydroxyphenylthio)-2,3-dioxapentane.

In order to adjust the molecular weight of the PC-POS copolymer to be obtained, a terminal stopper (molecular weight modifier) may be used. Examples of the terminal stopper may include monohydric phenols, such as phenol, p-cresol, p-tert-butylphenol, p-tert-octylphenol, p-cumylphenol, p-nonylphenol, m-pentadecylphenol, and p-tert-amylphenol. Those monohydric phenols may be used alone or in combination thereof.

After the interfacial polycondensation reaction, the PC-POS copolymer (A) may be obtained by appropriately leaving the resultant at rest to separate the resultant into an aqueous phase and an organic solvent phase [separating step], washing the organic solvent phase (preferably washing the phase with a basic aqueous solution, an acidic aqueous solution, and water in the stated order) [washing step], concentrating the resultant organic phase [concentrating step], and drying the concentrated phase [drying step].

<(B) Aromatic Polycarbonate-Based Resin>

The aromatic polycarbonate-based resin (B) except the polycarbonate-polyorganosiloxane copolymer (A) forms the matrix portion of the polycarbonate-based resin (S) and may be contained in the domain (d-2).

The aromatic polycarbonate-based resin (B) includes, in a main chain thereof, a repeating unit represented by the following general formula (III). The polycarbonate-based resin is not particularly limited, and various known polycarbonate-based resins may each be used.

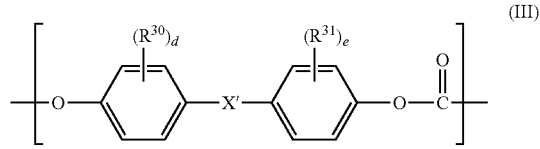
(III)

wherein $R^{30}$ and $R^{31}$ each independently represent a halogen atom, an alkyl group having 1 to 6 carbon atoms, or an alkoxy group having 1 to 6 carbon atoms, X' represents a single bond, an alkylene group having 1 to 8 carbon atoms, an alkylidene group having 2 to 8 carbon atoms, a cycloalkylene group having 5 to 15 carbon atoms, a cycloalkylidene group having 5 to 15 carbon atoms, —S—, —SO—, —SO$_2$—, —O—, or —CO—, and "d" and "e" each independently represent an integer of from 0 to 4.

Specific examples of $R^{30}$ and $R^{31}$ include the same examples as those of $R^1$ and $R^2$, and preferred examples thereof are also the same as those of $R^1$ and $R^2$. $R^{30}$ and $R^{31}$ each more preferably represent an alkyl group having 1 to 6 carbon atoms or an alkoxy group having 1 to 6 carbon atoms. Specific examples of X' include the same examples as those of X, and preferred examples thereof are also the same as those of X. "d" and "e" each independently represent preferably from 0 to 2, more preferably 0 or 1.

Specifically, a resin obtained by a conventional production method for a polycarbonate may be used as the aromatic polycarbonate-based resin (B). Examples of the conventional method include: an interfacial polymerization method involving causing the dihydric phenol-based compound and phosgene to react with each other in the presence of an organic solvent inert to the reaction and an aqueous alkali solution, adding a polymerization catalyst, such as a tertiary amine or a quaternary ammonium salt, to the resultant, and polymerizing the mixture; and a pyridine method involving dissolving the dihydric phenol-based compound in pyridine or a mixed solution of pyridine and an inert solvent, and introducing phosgene to the solution to directly produce the resin.

A molecular weight modifier (terminal stopper), a branching agent, or the like is used as required in the reaction.

The dihydric phenol-based compound is, for example, a compound represented by the following general formula (III'):

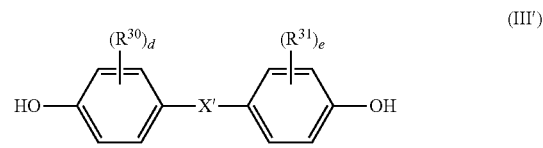
(III')

wherein $R^{30}$, $R^{31}$, X', "d", and "e" are as defined above, and preferred examples thereof are also the same as those described above.

Specific examples of the dihydric phenol-based compound may include those described above in the method of producing the polycarbonate-polyorganosiloxane copolymer (A), and preferred examples thereof are also the same as those described above. Among them, bis(hydroxyphenyl)alkane-based dihydric phenols are preferred, and bisphenol A is more preferred.

The aromatic polycarbonate-based resins may be used alone or in combination thereof. The aromatic polycarbonate resin (B) may have a structure free of such a polyorganosiloxane block as represented by the formula (II) unlike the polycarbonate-polyorganosiloxane copolymer (A). For example, the aromatic polycarbonate-based resin (B) may be a homopolycarbonate resin.

<(C) Polyester-Based Resin>

The polyester-based resin (C) to be used in the polycarbonate-based resin composition of the present invention is a polymer or copolymer obtained by a condensation reaction involving using an aromatic dicarboxylic acid or a reactive derivative thereof and a diol or an ester derivative thereof as main components.

Examples of the aromatic dicarboxylic acid include terephthalic acid, isophthalic acid, o-phthalic acid, 1,5-naphthalenedicarboxylic acid, 2,6-naphthalenedicarboxylic acid, 4,4'-biphenyldicarboxylic acid, 4,4'-biphenyl ether dicarboxylic acid, 4,4'-biphenylmethane dicarboxylic acid, 4,4'-biphenyl sulfone dicarboxylic acid, 4,4'-biphenylisopropylidene dicarboxylic acid, 1,2-bis(phenoxy)ethane-4,4'-dicarboxylic acid, 2,5-anthracenedicarboxylic acid, 2,6-anthracenedicarboxylic acid, 4,4'-p-terphenylenedicarboxylic acid, and 2,5-pyridinedicarboxylic acid. Substituted products (e.g., alkyl group-substituted products, such as 5-methylisophthalic acid) and reactive derivatives (e.g., alkyl ester derivatives, such as dimethyl terephthalate and diethyl terephthalate) thereof may also be used.

Among them, terephthalic acid and 2,6-naphthalenedicarboxylic acid, and alkyl ester derivatives thereof are more preferred, and terephthalic acid and alkyl ester derivatives thereof are particularly preferred. Those aromatic dicarboxylic acids may be used alone or in combination thereof. One or more of, for example, aliphatic dicarboxylic acids, such as adipic acid, azelaic acid, sebacic acid, and dodecanedioic acid, and alicyclic dicarboxylic acids, such as cyclohexane dicarboxylic acid, may also be used in combination with the aromatic dicarboxylic acid.

Examples of the diols each serving as a component of the polyester-based resin (C) may include: aliphatic diols, such as ethylene glycol, diethylene glycol, 1,2-propylene glycol, 1,3-propanediol, triethylene glycol, 1,4-butanediol, neopentyl glycol, 1,5-pentanediol, 1,6-hexanediol, decamethylene glycol, and 2,2-dimethyl-1,3-propanediol; alicyclic diols, such as 1,4-cyclohexanedimethanol, 1,3-cyclohexanedimethanol, cyclohexanediol, and trans- or cis-2,2,4,4-tetramethyl-1,3-cyclobutanediol; and aromatic diols, such as p-xylenediol, bisphenol A, tetrabromobisphenol A, and tetrabromobisphenol A-bis(2-hydroxyethyl ether). Substituted products thereof may also be used.

Among them, interms of heat resistance, dimensional stability, and the like, an aliphatic diol is preferred, ethylene glycol, 1,4-butanediol, or 1,4-cyclohexanedimethanol is more preferred, and ethylene glycol is particularly preferred. The diols may be used alone or in combination thereof. In addition, one or more of long-chain diols each having a molecular weight of from 400 to 6,000, that is, for example, a polyethylene glycol, a poly-1,3-propylene glycol, and a polytetramethylene glycol may be used as diol components in combination with the above-mentioned diols and copolymerized therewith.

The polyester-based resin (C) may be copolymerized with a hydroxycarboxylic acid, such as parahydroxybenzoic acid, any other carboxylic acid, or an alcohol except the above-mentioned diols, and such copolymerized resin may also be used in the present invention. However, the amount of such copolymerized component is preferably as small as possible, and components derived from the aromatic dicarboxylic acid and the aliphatic diol account for preferably 80 mass % or more, more preferably 90 mass % or more of the polyester-based resin (C). In addition, one kind of compound accounts for preferably 80 mol % or more, more preferably 90 mol % or more of each of the aromatic dicarboxylic acid and the aliphatic diol.

The polyester-based resin (C) may be branched by introducing a small amount of a branching agent. Although the kind of the branching agent is not limited, examples thereof include trimesic acid, trimellitic acid, trimethylolethane, trimethylolpropane, and pentaerythritol.

Specific examples of the polyester-based resin (C) include: polyethylene terephthalate (PET), polypropylene terephthalate, polybutylene terephthalate (PBT), polyhexylene terephthalate, polyethylene naphthalate (PEN), polybutylene naphthalate (PBN), and polyethylene-1,2-bis(phenoxy)ethane-4,4'-dicarboxylate; and copolymerized polyester-based resins, such as polyethylene isophthalate/terephthalate and polybutylene terephthalate/isophthalate. Among them, polyethylene terephthalate, polybutylene terephthalate, polyethylene naphthalate, and polybutylene naphthalate, and mixtures thereof having balanced mechanical properties and the like may be preferably used. The compounds preferably have, for example, a ratio "PET:PBT" of from 1:1 to 1:8 (mass ratio) when used in combination.

<Other Components>

Any other additive may be incorporated into the polycarbonate-based resin composition of the present invention to the extent that the effects of the present invention are not impaired. Examples of the other additive may include a flame retardant, a flame retardant auxiliary, an antioxidant, a UV absorber, a release agent, a reinforcing material, a filler, an elastomer for an impact resistance improvement, a dye, a pigment, and an antistatic agent.

The polycarbonate-based resin composition of the present invention is obtained by: blending the above-mentioned respective components at the above-mentioned ratios and various optional components to be used as required at appropriate ratios; and kneading the components.

In one aspect of the present invention, the total content of the component (A), the component (B), and the component (C) is preferably from 80 mass % to 100 mass %, more preferably from 95 mass % to 100 mass % with respect to the total amount (100 mass %) of the polycarbonate-based resin composition.

In another aspect of the present invention, the total content of the component (A), the component (B), the component (C), and the other component is preferably from 90 mass % to 100 mass %, more preferably from 95 mass % to 100 mass % with respect to the total amount (100 mass %) of the polycarbonate-based resin composition.

The blending and the kneading may be performed by a method involving premixing with a typically used apparatus, such as a ribbon blender or a drum tumbler, and using, for example, a Henschel mixer, a Banbury mixer, a single-screw extruder, a twin-screw extruder, a multi-screw extruder, or a Ko-kneader. In normal cases, a heating temperature at the time of the kneading is appropriately selected from the range of from 240° C. or more to 320° C. or less. An extruder, in particular a vented extruder is preferably used in the melt-kneading.

[Molded Article]

Various molded bodies may each be produced by an injection molding method, an injection compression molding method, an extrusion molding method, a blow molding method, a press molding method, a vacuum molding method, an expansion molding method, or the like using as a raw material the melt-kneaded polycarbonate-based resin composition of the present invention or a pellet obtained through the melt-kneading. In particular, the pellet obtained through the melt-kneading can be suitably used in the production of injection-molded bodies by injection molding and injection compression molding.

The molded article comprising the polycarbonate-based resin composition of the present invention can be suitably used as, for example: a casing for parts for electrical and electronic equipment, such as a television, a radio, a video camera, a videotape recorder, an audio player, a DVD player, an air conditioner, a cellular phone, a display, a computer, a register, an electronic calculator, a copying machine, a printer, a facsimile, a communication base station, or a battery; or parts for an automobile and a building material.

EXAMPLES

The present invention is more specifically described by way of Examples. However, the present invention is by no means limited by these Examples. In each of Examples, characteristic values and evaluation results were determined in the following manner.

(1) Chain Length and Content of Polydimethylsiloxane

The chain length and content of a polydimethylsiloxane were calculated by NMR measurement from the integrated value ratio of a methyl group of the polydimethylsiloxane. In this description, the polydimethylsiloxane is sometimes abbreviated as "PDMS".

<Quantification Method for Chain Length of Polydimethylsiloxane> $^1$H-NMR Measurement Conditions NMR apparatus: ECA500 manufactured by JEOL Resonance Co., Ltd.

Probe: 50TH5AT/FG2

Observed range: −5 ppm to 15 ppm

Observation center: 5 ppm

Pulse repetition time: 9 sec

Pulse width: 45°

NMR sample tube: 5 φ

Sample amount: 30 mg to 40 mg

Solvent: deuterochloroform

Measurement temperature: room temperature

Number of scans: 256 times

Allylphenol-Terminated Polydimethylsiloxane

A: an integrated value of a methyl group in a dimethylsiloxane moiety observed around δ −0.02 to δ 0.5

B: an integrated value of a methylene group in allylphenol observed around δ 2.50 to δ 2.75

Chain length of polydimethylsiloxane=(A/6)/(B/4) Eugenol-terminated Polydimethylsiloxane A: an integrated value of a methyl group in a dimethylsiloxane moiety observed around δ −0.02 to δ 0.5

B: an integrated value of a methylene group in eugenol observed around δ 2.40 to δ 2.70

Chain length of polydimethylsiloxane=(A/6)/(B/4)

<Quantification Method for Content of Polydimethylsiloxane>

Quantification method for the copolymerization amount of a polydimethylsiloxane in a PTBP-terminated polycarbonate obtained by copolymerizing an allylphenol-terminated polydimethylsiloxane.

NMR apparatus: ECA-500 manufactured by JEOL Resonance Co., Ltd.

Probe: TH5 corresponding to 5 φ NMR sample tube
Observed range: −5 ppm to 15 ppm
Observation center: 5 ppm
Pulse repetition time: 9 sec
Pulse width: 45°
Number of scans: 256 times
NMR sample tube: 5 φ
Sample amount: 30 mg to 40 mg
Solvent: deuterochloroform
Measurement temperature: room temperature A: an integrated value of a methyl group in a BPA moiety observed around δ 1.5 to δ 1.9

B: an integrated value of a methyl group in a dimethylsiloxane moiety observed around δ −0.02 to δ 0.3

C: an integrated value of a butyl group in a p-tert-butylphenyl moiety observed around δ 1.2 to δ 1.4 a=A/6
b=B/6
c=C/9
T=a+b+c
f=a/T×100
g=b/T×100
h=c/T×100
TW=f×254+g×74.1+h×149
PDMS (wt %)=g×74.1/TW×100

(2) Viscosity-Average Molecular Weight

A viscosity-average molecular weight (Mv) was calculated from the following equation (Schnell's equation) by using a limiting viscosity [η] determined through the measurement of the viscosity of a methylene chloride solution at 20° C. with an Ubbelohde-type viscometer.

$$[\eta]=1.23\times10^{-5}\times Mv^{0.83}$$

The viscosity-average molecular weight (Mv) of the polycarbonate-based resin (S) was determined from the value of the arithmetic average of the viscosity-average molecular weights of the polycarbonate-polyorganosiloxane copolymer (A) and the aromatic polycarbonate-based resin (B).

<Method of Observing Domain Structure with SPM>

SPM apparatus: Nano-IM (manufactured by PNI)
Probe: PPP-NCHR (manufactured by Nanosensors)
Size of observation field of view: A 1-micrometer square, a 2-micrometer square, or a 5-micrometer square Observed site: A surface formed of the machine direction (MD) and thickness direction (ND) of the central portion of a section distant from the end portion of an Izod test piece (measuring 63.5 mm long by 12.7 mm wide by 3.2 mm thick) to be described later on a side opposite to a gate by about 5 mm Pretreatment method: An Izod test piece to be described later was cut, and the resultant cut sample was subjected to surface shaping adjustment. Subsequently, an observation surface was produced by cut section processing with a freezing microtome. Details about the respective procedures are as described below.

[1. Cutting of Izod Test Piece]

Figure 4:
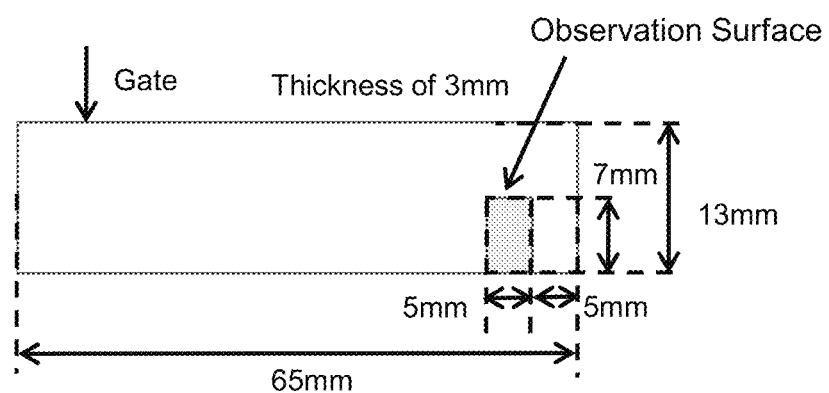
FIG. 4 is a view for illustrating the position at which a test piece to be subjected to the observation of a domain structure with a SPM is cut out of an Izod test piece.

The Izod test piece was cut at a position illustrated in FIG. 4 to provide a sample piece measuring 7 mm long by 5 mm wide by 3.2 mm thick.

[2. Surface Shaping Adjustment from Cut-Out Sample]

The observation surface side of the test piece obtained in the 1. was trimmed into a quadrangular pyramid shape with a trimming apparatus ("Leica EM TRIM" [manufactured by Leica Microsystems]).

Subsequently, the apices of the quadrangular pyramid were cut off with a microtome ("ULTRACUT S" [manufactured by Leica Microsystems]) at normal temperature so that a surface of about a 150-micrometer square appeared.

Figure 6:
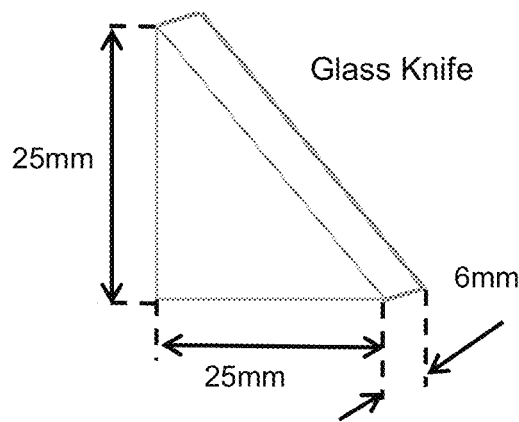
FIG. 6 is a view for illustrating the shape of a glass knife used at the time of cutting with a microtome.

The shape of a glass knife used in the microtome is as illustrated in FIG. 6. A "glass rod for a glass knife (length: 400 mm, width: 25 mm, thickness: 6 mm)" [Nisshin EM Co., Ltd., Tokyo] was used as a material, and a glass knife maker ("Leica EM KMR2" [manufactured by Leica Microsystems]) was used as a processing apparatus. The fracture surface of the produced glass knife was observed with a microscope, and such a glass knife that no chip was observed in a side to be used in the cutting was used.

[3. Production of Observation Surface by Cutting with Freezing Microtome]

The sample subjected to the surface shaping in the 2. was placed in a cooling box placed in a freezing microtome ("ULTRACUT R" [manufactured by Leica Microsystems]) together with the glass knife. Liquid nitrogen was used to set an atmospheric temperature in the box to −120° C., and the sample was cooled at the temperature for 1 hour.

Figure 5:
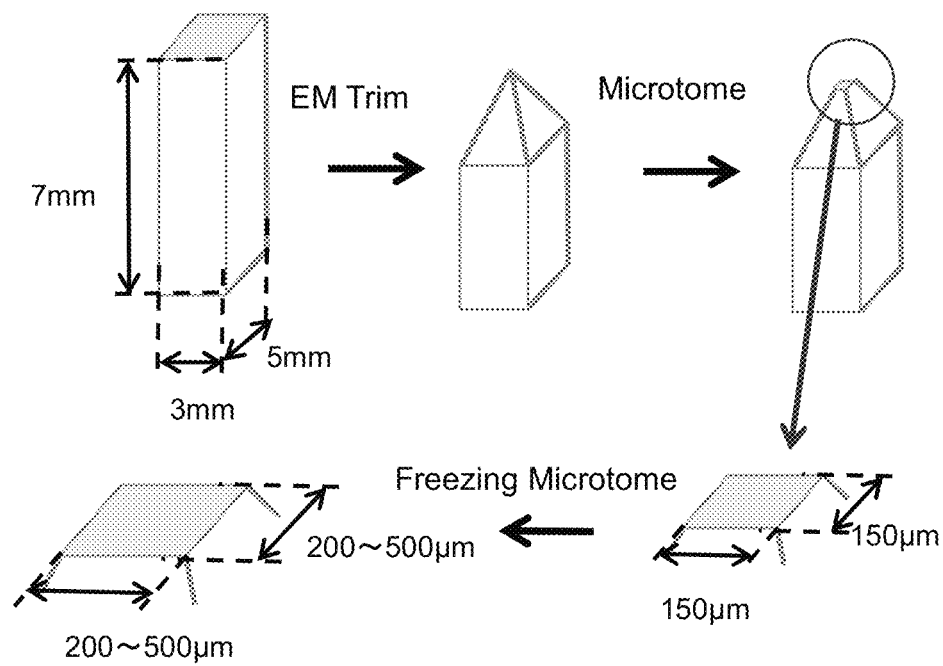
FIG. 5 is a view for illustrating a surface shaping adjustment procedure for a cut-out Izod sample piece for SPM observation.

Subsequently, the sample was cut out into a surface of from about a 200-micrometer square to about a 500-micrometer square as illustrated in FIG. 5 without being removed from the cooling box. Thus, the observation surface was obtained.

Measurement Mode: A Phase Difference Mode

Domain to be evaluated: A domain whose entirety was reflected in an observation field of view was defined as a domain to be evaluated.

Size of observation field of view to be used in domain evaluation: When the number of domains to be evaluated in the case of observation in a 1-micrometer square was 21 or more, the 1-micrometer square was defined as the size of an observation field of view to be used in a domain evaluation, when the number was from 6 or more to 20 or less, a 2-micrometer square was defined as the size of the observation field of view to be used in the domain evaluation, and when the number was 5 or less, a 5-micrometer square was defined as the size of the observation field of view to be used in the domain evaluation.

Number of domains to be observed: The observation number of domains to be evaluated to be used in the calculation of the ratio of the number of the domains (d), the average sectional area of the domains, and the average of distances between the adjacent particles of the domains was set to 70 or more. When the number of domains to be evaluated per one observation field of view was less than 70, additional observation was performed until the number became 70 or more.

Image Analysis Software: SPIP

Figure 7:
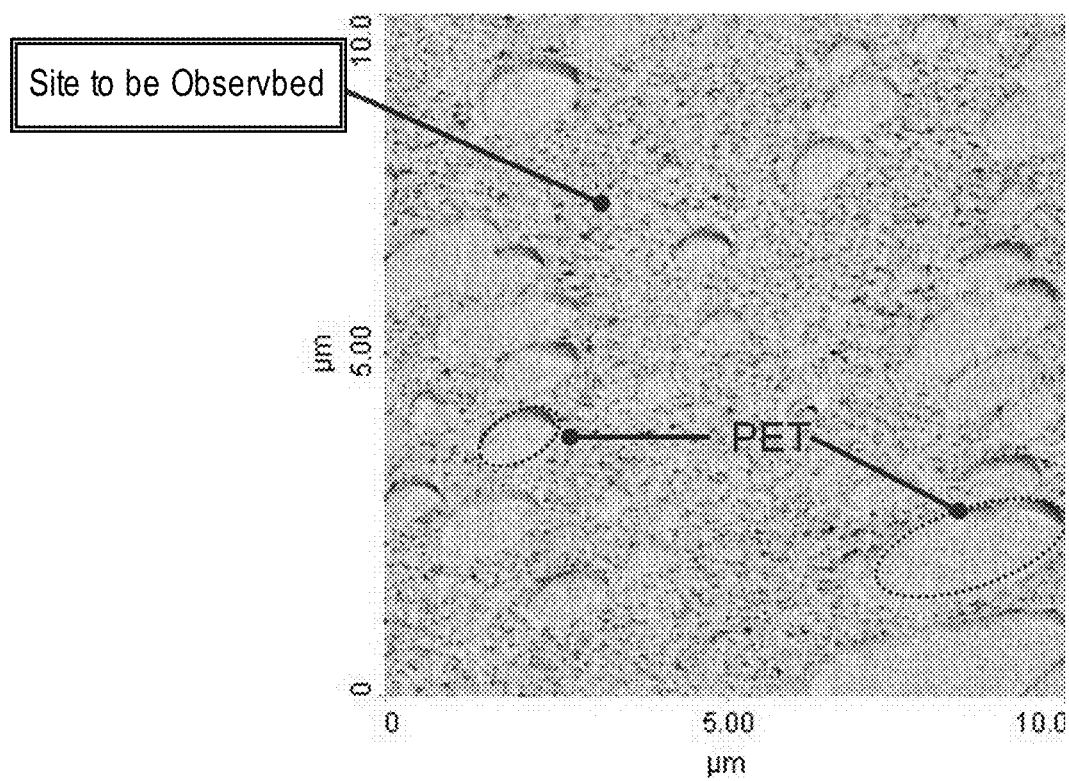
FIG. 7 is a photograph for showing a method of selecting a site to be observed with the SPM at a low magnification (10 microns by 10 microns).

A polyethylene terephthalate (hereinafter sometimes referred to as "PET") is incompatible with the polycarbonate-based resin (S), and hence such a domain formed of the PET as shown in FIG. 7 is formed in a matrix formed of the polycarbonate-based resin (S). The domain formed of the PET undergoes a phase separation from the polycarbonate-based resin (S), and hence a site in which no domain formed of the PET is present needs to be subjected to the measurement for observing the domain (d) present in the aromatic polycarbonate-based resin (B).

Accordingly, first, SPM measurement was performed in a wide field of view measuring about 10 μm by about 10 μm to confirm a region free of any domain formed of the PET. After that, the region was observed in an extended field of view (1 μm by 1 μm or 2 μm by 2 μm).

<Judgment of Presence/Absence of Domain (d) with SPM, and Methods of Calculating Number of Domains (d-2) Inside Domain (d-1) and Ratio of Number of Domains (d) to Total Number of all Domains>

The number of all domains to be evaluated was automatically calculated with the SPIP, and the number of the domains (d) was visually counted.

<Method of Calculating Average Sectional Area of Domains with SPM>

The sectional areas of the respective domains were automatically calculated by subjecting the domains to image processing with the SPIP, and their average was calculated.

<Method of Calculating Average of Distances Between Adjacent Particles with SPM>

Distances between the adjacent particles of the respective domains were automatically calculated with the SPIP, and their average was calculated.

<Production of Polycarbonate Oligomer>

Sodium dithionite was added in an amount of 2,000 ppm with respect to bisphenol A (BPA) (to be dissolved later) to 5.6 mass % aqueous sodium hydroxide, and then BPA was dissolved in the mixture so that the concentration of BPA was 13.5 mass %. Thus, a solution of BPA in aqueous sodium hydroxide was prepared. The solution of BPA in aqueous sodium hydroxide, methylene chloride, and phosgene were continuously passed through a tubular reactor having an inner diameter of 6 mm and a tube length of 30 m at flow rates of 40 L/hr, 15 L/hr, and 4.0 kg/hr, respectively. The tubular reactor had a jacket portion and the temperature of the reaction liquid was kept at 40° C. or less by passing cooling water through the jacket. The reaction liquid that had exited the tubular reactor was continuously introduced into a baffled vessel type reactor provided with a sweptback blade and having an internal volume of 40 L. The solution of BPA in aqueous sodium hydroxide, 25 mass % aqueous sodium hydroxide, water, and a 1 mass % aqueous solution of triethylamine were further added to the reactor at flow rates of 2.8 L/hr, 0.07 L/hr, 17 L/hr, and 0.64 L/hr, respectively, to perform a reaction. An aqueous phase was separated and removed by continuously taking out the reaction liquid overflowing the vessel type reactor and leaving the reaction liquid at rest. Then, a methylene chloride phase was collected.

The polycarbonate oligomer thus obtained had a concentration of 341 g/L and a chloroformate group concentration of 0.71 mol/L.

Production Example 1

<PC-POS Copolymer (A-1a)>

Values for the following (i) to (xiv) are as shown in Table 1.

(i) L of the polycarbonate oligomer solution (PCO) produced as described above, (ii) L of methylene chloride (MC), a solution obtained by dissolving (iv) g of an allylphenol terminal-modified polydimethylsiloxane having an average chain length "n" of (iii) in (v) L of methylene chloride (MC), and (vi) mL of triethylamine (TEA) were loaded into a 50-liter vessel-type reactor including a baffle board, a paddle-type stirring blade, and a cooling jacket. (vii) g of 6.4 mass % aqueous sodium hydroxide (NaOHaq) was added to the mixture under stirring, and a reaction between the polycarbonate oligomer and the allylphenol terminal-modified PDMS was performed for 20 minutes.

A solution of p-tert-butylphenol (PTBP) in methylene chloride (obtained by dissolving (viii) g of PTBP in (ix) L of methylene chloride (MC)) and a solution of BPA in aqueous sodium hydroxide (obtained by dissolving (xiii) g of BPA in an aqueous solution obtained by dissolving (x) g of NaOH and (xi) g of sodium dithionite ($Na_2S_2O_4$) in (xii) L of water) were added to the polymerization liquid, and the mixture was subjected to a polymerization reaction for 40 minutes.

(xiv) L of methylene chloride (MC) was added to the resultant for dilution, and the mixture was stirred for 10 minutes. After that, the mixture was separated into an organic phase containing a PC-POS, and an aqueous phase containing excess amounts of BPA and NaOH, and the organic phase was isolated.

A solution of the PC-POS in methylene chloride thus obtained was sequentially washed with 0.03 mol/L aqueous NaOH and 0.2 mol/L hydrochloric acid in amounts of 15 vol % each with respect to the solution. Next, the solution was repeatedly washed with pure water until an electric conductivity in an aqueous phase after the washing became 0.01 μS/m or less.

The solutions of the polycarbonates in methylene chloride obtained by the washing were concentrated and pulverized, and the resultant flakes were dried under reduced pressure at 120° C. to provide PC-POS copolymers (A1) to (A17). The resultant flake was subjected to the measurement of a PDMS content, an unreacted PDMS amount, and a viscosity-average molecular weight.

Production Example 2

<PC-POS Copolymer (A-1b)>

Production and measurement were performed in the same manner as in Production Example 1 except that the values (i) to (xiv) were changed as described in Table 1.

TABLE 1

|  | Production Example 1 | Production Example 2 |
| --- | --- | --- |
| PC-POS(A) | A-1a | A-1b |
| (i) PCO (L) | 11 | 11 |
| (ii) MC (L) | 24.5 | 24.5 |
| (iii) PDMS chain length (n) | 61 | 88 |
| (iv) PDMS loading amount (g) | 1,800 | 1,400 |
| (v) MC (L) | 2.0 | 2.0 |
| (vi) TEA (mL) | 6.2 | 6.2 |
| (vii) NaOHaq (g) | 1,405 | 937 |

TABLE 1-continued

|  | Production Example 1 | Production Example 2 |
|---|---|---|
| (viii) PTBP (g) | 107.6 | 107.6 |
| (ix) MC (L) | 0.5 | 0.5 |
| (x) NaOH (g) | 412 | 412 |
| (xi) Na$_2$S$_2$O$_4$ (g) | 1.5 | 1.5 |
| (xii) Water (L) | 6.0 | 6.0 |
| (xiii) BPA (g) | 766 | 766 |
| (xiv) MC (L) | 0 | 0 |
| PDMS content (wt %) | 30 | 25 |
| Unreacted PDMS amount (ppm) | ≤150 | ≤150 |
| Mv | 17,700 | 17,700 |

<PC-POS Copolymer (A-2)>
PC-POS copolymer A-2a: "FG1700" [PC-POS copolymer, polyorganosiloxane block chain length: 88, polyorganosiloxane content: 6 mass %, viscosity-average molecular weight Mv: 17,700]

<Aromatic Polycarbonate-Based Resin (B)>
Aromatic polycarbonate-based resin B-1: "FN2500" [viscosity-average molecular weight Mv: 23,500]
Aromatic polycarbonate-based resin B-2: "FN2200" [viscosity-average molecular weight Mv: 21,300]
Aromatic polycarbonate-based resin B-3: "FN1900" [viscosity-average molecular weight Mv: 19,300]
Aromatic polycarbonate-based resin B-4: "FN1700" [viscosity-average molecular weight Mv: 17,700]

<Polyester-Based Resin (C)>
Polyethylene terephthalate: "J055" [manufactured by Mitsui Chemicals, Inc.]
Polyethylene terephthalate: "KS760K-12" [manufactured by Kuraray Co., Ltd.]
Polybutylene terephthalate: "1401X06" [manufactured by Toray Industries, Inc.]
Polybutylene terephthalate: "DURANEX 2002 EF2001N" [manufactured by Polyplastics Co., Ltd.]

<Other Component>
Antioxidant: "IRGAFOS 168 (product name)" [tris(2,4-di-tert-butylphenyl) phosphite, manufactured by BASF Japan]
Antioxidant: "IRGANOX 1076 (product name)" [octadecyl 3-(3,5-di-tert-butyl-4-hydroxyphenyl)propionate, manufactured by BASF Japan]

Reference Examples 1 and 2, Examples 1 to 34, and Comparative Examples 1 to 10

Figure 8:
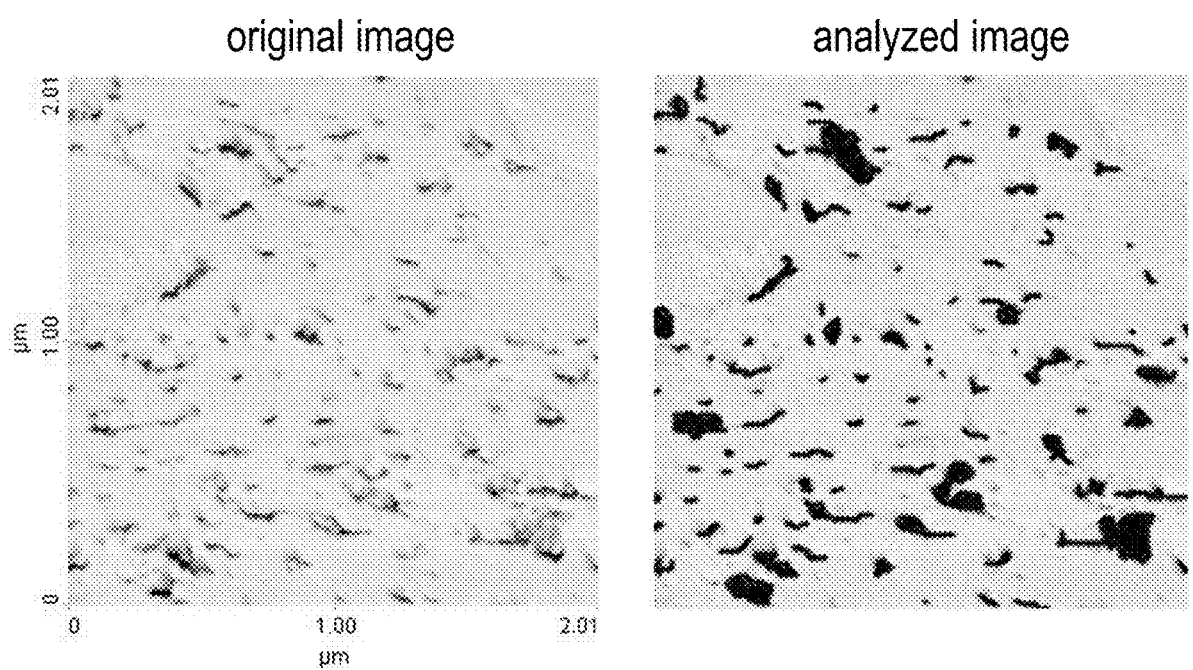
FIG. 8 are an image of a domain structure observed with the SPM in Example 4 and an analyzed image in which a site recognized as a domain is painted in black at the time of the analysis of the observed image.
Figure 9:
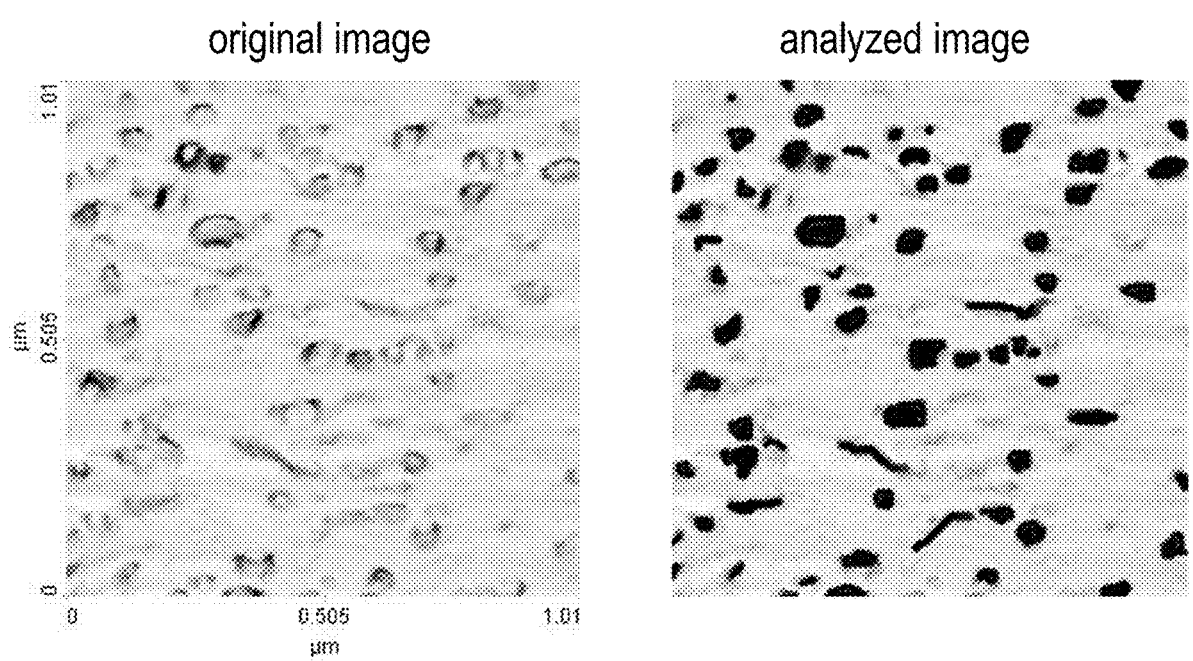
FIG. 9 are an image of a domain structure observed with the SPM in Example 5 and an analyzed image in which a site recognized as a domain is painted in black at the time of the analysis of the observed image.
Figure 10:
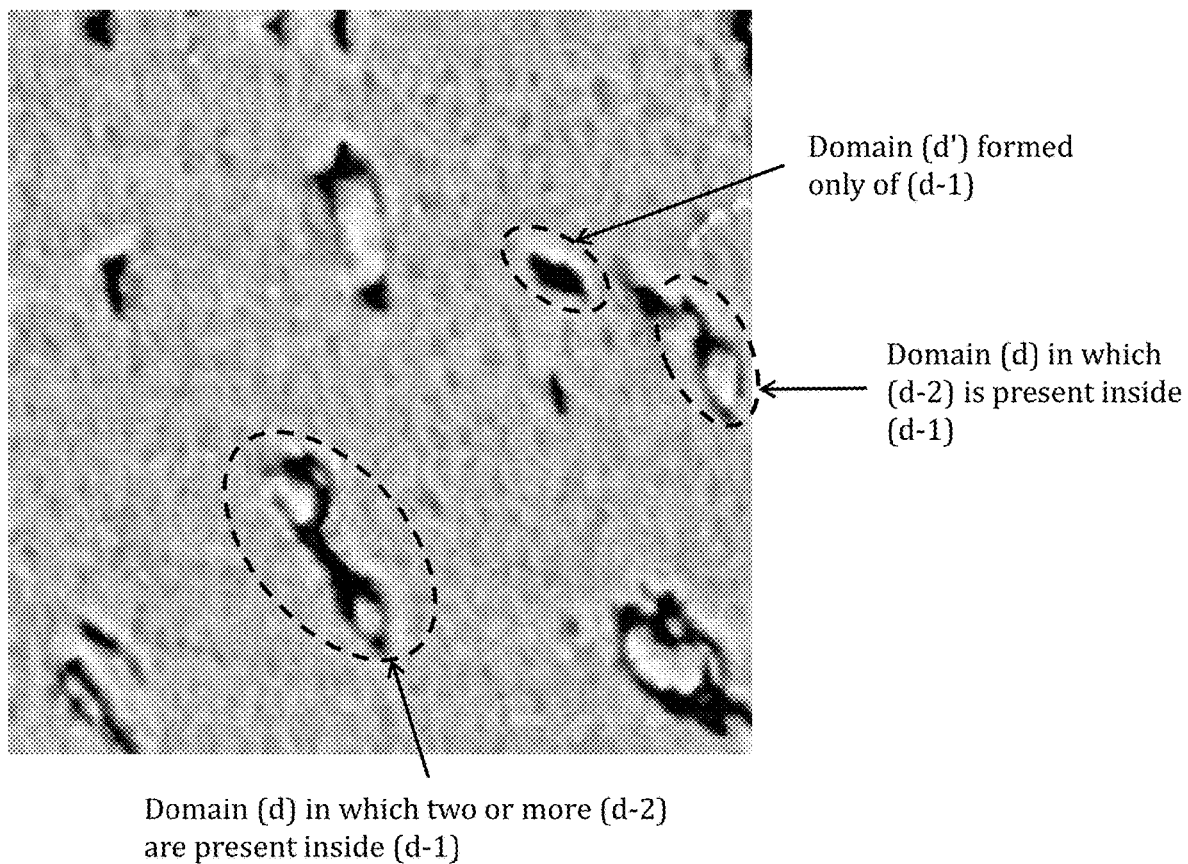
FIG. 10 is an image of a domain structure observed with the SPM in Reference Example 1.

The PC-POS copolymers A-1a and A-1b obtained in Production Examples 1 and 2, and the other respective components were mixed at blending ratios shown in Table 2 to Table 6. Each of the mixtures was supplied to a vented twin-screw extruder (manufactured by Toshiba Machine Co., Ltd., TEM-35B), and was melt-kneaded at a screw revolution number of 150 rpm, an ejection amount of 20 kg/hr, and a resin temperature of from 295° C. to 300° C. to provide an evaluation pellet sample. Image observation and image analysis with the SPM were performed by using the evaluation pellet sample. Typical images (the images each correspond to a 1-micrometer square) of the results of the observation of the respective polycarbonate resin compositions obtained in Examples 4 and 5, and Reference Example 1 with the SPM are shown in FIG. 8 to FIG. 10.

TABLE 2

|  |  |  | Reference Example 1 | Reference Example 2 | Example 1 | Example 2 | Example 3 | Comparative Example 1 | Example 4 |
|---|---|---|---|---|---|---|---|---|---|
| A-1 | A-1a (Production Example 1) | parts by mass | 8 | 15 |  |  |  |  | 12 |
|  | A-1b (Production Example 2) | parts by mass |  | 9.6 |  | 18 |  |  |  |
| A-2 | FG1700 | parts by mass |  |  |  |  | 75 |  |  |
| B | B-1 (FN2500) | parts by mass |  |  |  |  |  |  | 15 |
|  | B-2 (FN2200) | parts by mass |  |  |  |  |  |  |  |
|  | B-3 (FN1900) | parts by mass |  |  |  |  |  |  |  |
|  | B-4 (FN1700) | parts by mass | 92 | 90.4 | 60 | 57 |  | 75 | 48 |
| C | J055 | parts by mass |  |  | 25 | 25 | 25 | 25 | 25 |
|  | KS760K-12 | parts by mass |  |  |  |  |  |  |  |

TABLE 2-continued

|   |   |   |   |   |   |   |   |   |   |
|---|---|---|---|---|---|---|---|---|---|
|   | 1401X06 | parts by mass |   |   |   |   |   |   |   |
| Other | Irgafos 168 | parts by mass | 0.05 | 0.05 | 0.10 | 0.10 | 0.10 | 0.10 | 0.10 |
|   | Irganox 1076 | parts by mass |   | 0.10 | 0.10 | 0.10 | 0.10 | 0.10 |
| Polyorganosiloxane block content in PC-based resin (S) | | mass % | 2.4 | 2.4 | 6.0 | 6.0 | 6.0 | 0.0 | 4.8 |
| Viscosity-average molecular weight (Mv) of PC-based resin (S) | | — | 17,700 | 177,00 | 17,700 | 17,700 | 17,700 | 17,700 | 18,900 |

|   |   |   | Example 5 | Example 6 | Comparative Example 2 | Example 7 | Example 8 | Example 9 | Comparative Example 3 |
|---|---|---|---|---|---|---|---|---|---|
| A-1 | A-1a (Production Example 1) | parts by mass |   |   |   | 7.5 |   |   |   |
|   | A-1b (Production Example 2) | parts by mass | 14.4 |   |   |   |   | 9 |   |
| A-2 | FG1700 | parts by mass |   | 60 |   |   |   | 37.5 |   |
| B | B-1 (FN2500) | parts by mass | 15 | 15 |   | 37.5 | 37.5 | 37.5 |   |
|   | B-2 (FN2200) | parts by mass |   |   |   |   |   |   | 43 |
|   | B-3 (FN1900) | parts by mass |   |   | 57 |   |   |   | 32 |
|   | B-4 (FN1700) | parts by mass | 45.6 |   | 18 | 30 | 28.5 |   |   |
| C | J055 | parts by mass | 25 | 25 | 25 | 25 | 25 | 25 | 25 |
|   | KS760K-12 | parts by mass |   |   |   |   |   |   |   |
|   | 1401X06 | parts by mass |   |   |   |   |   |   |   |
| Other | Irgafos 168 | parts by mass | 0.10 | 0.10 | 0.10 | 0.10 | 0.10 | 0.10 | 0.10 |
|   | Irganox 1076 | parts by mass | 0.10 | 0.10 | 0.10 | 0.10 | 0.10 | 0.10 | 0.10 |
| Polyorganosiloxane block content in PC-based resin (S) | | mass % | 4.8 | 4.8 | 0.0 | 3.0 | 3.0 | 3.0 | 0.0 |
| Viscosity-average molecular weight (Mv) of PC-based resin (S) | | — | 18,900 | 18,900 | 18,900 | 20,600 | 20,600 | 20,600 | 20,400 |

TABLE 2-continued

| | | Reference Example 1 | Reference Example 2 | Example 1 | Example 2 | Example 3 | Comparative Example 1 | Example 4 | Example 5 | Example 6 | Comparative Example 2 | Example 7 | Example 8 | Example 9 | Comparative Example 3 |
|---|---|---|---|---|---|---|---|---|---|---|---|---|---|---|---|
| Ratio of number of domains ($d^C$) to total number of domains ($d^C$) and ($d'^C$) | % | — | — | — | — | — | — | 35 | 79 | — | — | — | — | — | — |
| Average sectional area of all domains | nm² | 2,449 | 888 | — | — | — | — | 3,121 | 1,739 | — | — | — | — | — | — |
| Average distance of distances between adjacent particles of all domains | nm | 155 | 77 | — | — | — | — | 132 | 79 | — | — | — | — | — | — |
| MFR (300° C., 1.2 kg) | g/10 min | — | — | 13 | 13 | 13 | 21 | 12 | 11 | 11 | 17 | 10 | 11 | 10 | 13 |
| Q value (280° C., 160 kg) | ×0.01 ml/s | 13 | 13 | 11 | 11 | 11 | 11 | 11 | 10 | 10 | 10 | 7.6 | 7.9 | 6.8 | 7.7 |
| Izod impact strength (23° C.) | kJ/m² | 73 | 74 | 96 | 92 | 91 | 11 | 97 | 99 | 97 | 61 | 97 | 101 | 104 | 82 |
| Izod impact strength (0° C.) | kJ/m² | — | — | — | — | — | — | — | — | — | 10 | 93 | 96 | 89 | 10 |
| Izod impact strength (−10° C.) | kJ/m² | — | — | 84 | 83 | 80 | 9 | 83 | 79 | 76 | 9 | 77 | 57 | 22 | 10 |
| Izod impact strength (−20° C.) | kJ/m² | — | — | 74 | 70 | 29 | 9 | 74 | 31 | 13 | 9 | 20 | 18 | — | 9 |
| Izod impact strength (−30° C.) | kJ/m² | — | — | 31 | 23 | 19 | 8 | 24 | 19 | 16 | — | 15 | 14 | 13 | — |
| Izod impact strength (−40° C.) | kJ/m² | 54 | 53 | — | — | — | — | — | — | — | — | — | — | — | — |
| Deflection temperature under load | ° C. | 128 | 128 | 117 | 118 | 117 | 122 | 120 | 120 | 119 | 123 | 122 | 122 | 121 | 124 |
| Chemical resistance to isobutyl acetate | | | | A | A | A | B | A | A | A | B | A | A | A | B |
| Chemical resistance to toluene | | | | A | A | B | B | A | A | A | B | A | A | A | A |
| Chemical resistance to heptane | | | | A | A | A | A | A | A | A | A | A | A | A | A |

TABLE 3

| | | | Example 10 | Example 11 | Example 12 | Example 13 | Comparative Example 4 | Example 14 | Example 15 | Example 16 | Comparative Example 5 |
|---|---|---|---|---|---|---|---|---|---|---|---|
| A-1 | A-1a (Production Example 1) | parts by mass | 12 | | 7.5 | | | 13.6 | | | |
| | A-1b (Production Example 2) | parts by mass | | | | 9 | | | 16.3 | | |

TABLE 3-continued

|  |  |  | Example 10 | Example 11 | Example 12 | Example 13 | Comparative Example 4 | Example 14 | Example 15 | Example 16 | Comparative Example 5 |
|---|---|---|---|---|---|---|---|---|---|---|---|
| A-2 | FG1700 | parts by mass |  | 60 |  |  |  |  |  | 68 |  |
| B | B-1 (FN2500) | parts by mass | 15 | 15 | 37.5 | 37.5 | 37.5 | 17 | 17 | 17 |  |
|  | B-2 (FN2200) | parts by mass |  |  |  |  |  |  |  |  |  |
|  | B-3 (FN1900) | parts by mass |  |  |  |  |  |  |  |  | 62 |
|  | B-4 (FN1700) | parts by mass | 48 |  | 30 | 28.5 | 37.5 | 54.4 | 51.7 |  | 23 |
| C | J055 | parts by mass |  |  |  |  |  | 15 | 15 | 15 | 15 |
|  | KS760K-12 | parts by mass | 25 | 25 | 25 | 25 | 25 |  |  |  |  |
|  | 1401X06 | parts by mass |  |  |  |  |  |  |  |  |  |
| Other | Irgafos 168 | parts by mass | 0.10 | 0.10 | 0.10 | 0.10 | 0.10 | 0.10 | 0.10 | 0.10 | 0.10 |
|  | Irganox 1076 | parts by mass | 0.10 | 0.10 | 0.10 | 0.10 | 0.10 | 0.10 | 0.10 | 0.10 | 0.10 |
| Polyorganosiloxane block content in PC-based resin (S) |  | mass % | 4.8 | 4.8 | 3.0 | 3.0 | 3.0 | 4.8 | 4.8 | 4.8 | 0.0 |
| Viscosity-average molecular weight (Mv) of PC-based resin composition |  | — | 18,900 | 18,900 | 20,600 | 20,600 | 20,600 | 18,900 | 18,900 | 18,900 | 18,900 |

|  |  | Example 10 | Example 11 | Example 12 | Example 13 | Comparative Example 4 | Example 14 | Example 15 | Example 16 | Comparative Example 5 |
|---|---|---|---|---|---|---|---|---|---|---|
| Ratio of number of domains ($d^C$) to total number of domains ($d^C$) and ($d'^C$) | % | — | — | — | — | — | — | — | — | — |
| Average sectional area of all domains | $nm^2$ | — | — | — | — | — | — | — | — | — |
| Average distance of distances between adjacent particles of all domains | nm | — | — | — | — | — | — | — | — | — |
| MFR (300° C., 1.2 kg) | g/10 min | 14 | 14 | 13 | 13 | 12 | 12 | 11 | 13 | 18 |
| Q value (280° C., 160 kg) | ×0.01 ml/s | 12 | 12 | 11 | 10 | 10 | 9 | 9 | 11 | 9 |
| Izod impact strength (23° C.) | $kJ/m^2$ | 79 | 79 | 92 | 91 | 88 | 90 | 89 | 88 | 89 |
| Izod impact strength (0° C.) | $kJ/m^2$ | 60 | 20 | 74 | 32 | 16 | — | — | — | — |
| Izod impact strength (−10° C.) | $kJ/m^2$ | 25 | 16 | 18 | 16 | 13 | — | — | — | — |
| Izod impact strength (−20° C.) | $kJ/m^2$ | — | — | — | — | — | 88 | 82 | 75 | 10 |
| Izod impact strength (−30° C.) | $kJ/m^2$ | — | — | — | — | — | 85 | 77 | 64 | 10 |
| Izod impact strength (−40° C.) | $kJ/m^2$ | — | — | — | — | — | 69 | 59 | 24 | 9 |
| Deflection temperature under load | ° C. | 119 | 118 | 121 | 121 | 120 | 123 | 123 | 121 | 126 |
| Chemical resistance to isobutyl acetate |  | A | A | A | A | A | A | A | A | B |
| Chemical resistance to toluene |  | A | A | A | A | A | A | A | B | B |
| Chemical resistance to heptane |  | A | A | A | A | A | A | A | A | A |

TABLE 4

|  |  |  | Example 17 | Example 18 | Example 19 | Comparative Example 6 | Example 20 | Example 21 | Example 22 | Comparative Example 7 | Example 23 | Example 24 | Example 25 | Comparative Example 8 |
|---|---|---|---|---|---|---|---|---|---|---|---|---|---|---|
| A-1 | A-1a (Production Example 1) | parts by mass | 15.2 |  |  |  | 13.6 |  |  |  | 15.2 |  |  |  |
|  | A-1b (Production Example 2) | parts by mass |  | 18.2 |  |  |  | 16.3 |  |  |  | 18.2 |  |  |
| A-2 | FG1700 | parts by mass |  |  | 76 |  |  |  | 68 |  |  |  | 76 |  |
| B | B-1 (FN2500) | parts by mass | 19 | 19 | 19 |  | 17 | 17 | 17 |  | 19 | 19 | 19 |  |
|  | B-2 (FN2200) | parts by mass |  |  |  |  |  |  |  |  |  |  |  |  |
|  | B-3 (FN1900) | parts by mass |  |  |  | 70 |  |  |  | 62 |  |  |  | 70 |
|  | B-4 (FN1700) | parts by mass | 60.8 | 57.8 |  | 25 | 54.4 | 51.7 |  | 23 | 60.8 | 57.8 |  | 25 |
| C | J055 | parts by mass | 5 | 5 | 5 | 5 |  |  |  |  |  |  |  |  |

TABLE 4-continued

|  |  |  | Example 17 | Example 18 | Example 19 | Comparative Example 6 | Example 20 | Example 21 | Example 22 | Comparative Example 7 | Example 23 | Example 24 | Example 25 | Comparative Example 8 |
|---|---|---|---|---|---|---|---|---|---|---|---|---|---|---|
|  | KS760K-12 | parts by mass |  |  |  |  |  |  |  |  |  |  |  |  |
|  | 1401X06 | parts by mass |  |  |  | 15 | 15 | 15 | 15 | 5 | 5 | 5 | 5 |  |
| Other | Irgafos 168 | parts by mass | 0.10 | 0.10 | 0.10 | 0.10 | 0.10 | 0.10 | 0.10 | 0.10 | 0.10 | 0.10 | 0.10 | 0.10 |
|  | Irganox 1076 | parts by mass | 0.10 | 0.10 | 0.10 | 0.10 | 0.10 | 0.10 | 0.10 | 0.10 | 0.10 | 0.10 | 0.10 | 0.10 |
| Polyorganosiloxane block content in PC-based resin (S) |  | mass % | 4.8 | 4.8 | 4.8 | 0.0 | 4.8 | 4.8 | 4.8 | 0.0 | 4.8 | 4.8 | 4.8 | 0.0 |
| Viscosity-average molecular weight (Mv) of PC-based resin (S) |  | — | 18,900 | 18,900 | 18,900 | 18,900 | 18,900 | 18,900 | 18,900 | 18,900 | 18,900 | 18,900 | 18,900 | 18,900 |

|  |  | Example 17 | Example 18 | Example 19 | Comparative Example 6 | Example 20 | Example 21 | Example 22 | Comparative Example 7 | Example 23 | Example 24 | Example 25 | Comparative Example 8 |
|---|---|---|---|---|---|---|---|---|---|---|---|---|---|
| Ratio of number of domains ($d^C$) to total number of domains ($d^C$) and ($d'^C$) | % | — | — | — | — | — | — | — | — | — | — | — | — |
| Average sectional area of all domains | $nm^2$ | — | — | — | — | — | — | — | — | — | — | — | — |
| Average distance of distances between adjacent particles of all domains | nm | — | — | — | — | — | — | — | — | — | — | — | — |
| MFR (300° C., 1.2 kg) | g/10 min | 12 | 12 | 12 | 20 | 42 | 37 | 41 | 43 | 18 | 17 | 22 | 27 |
| Q value (280° C., 160 kg) | ×0.01 ml/s | 10 | 10 | 10 | 10 | 29 | 24 | 28 | 21 | 13 | 13 | 15 | 14 |
| Izod impact strength (23° C.) | $kJ/m^2$ | 84 | 84 | 84 | 82 | 94 | 103 | 95 | 7 | 86 | 87 | 88 | 11 |
| Izod impact strength (0° C.) | $kJ/m^2$ | — | — | — | 54 | 81 | 96 | 85 | 8 | — | — | — | — |
| Izod impact strength (−10° C.) | $kJ/m^2$ | — | — | — | 15 | 80 | 87 | 72 | 7 | — | — | — | — |
| Izod impact strength (−20° C.) | $kJ/m^2$ | — | — | — | — | 66 | 71 | 20 | 8 | — | — | — | — |
| Izod impact strength (−30° C.) | $kJ/m^2$ | 79 | 73 | 73 | 11 | 20 | 20 | 16 | 7 | 75 | 72 | 69 | 9 |
| Izod impact strength (−40° C.) | $kJ/m^2$ | 79 | 70 | 69 | 10 | — | — | — | — | 68 | 67 | 63 | 9 |
| Deflection temperature under load | ° C. | 125 | 125 | 124 | 128 | 102 | 102 | 102 | 105 | 118 | 118 | 117 | 121 |
| Chemical resistance to isobutyl acetate | Presence or absence of break | A | A | A | B | A | A | A | B | B | B | B | C |
|  | Whitening | B | B | B | B | B | B | B | B | B | B | B | B |
| Chemical resistance to heptane | Presence or absence of crack | A | A | A | A | A | A | A | B | A | A | B | B |

TABLE 5

|  |  |  | Example 26 | Example 27 | Example 28 | Comparative Example 9 | Comparative Example 10 |
|---|---|---|---|---|---|---|---|
| A-1 | A-1a (Production Example 1) | parts by mass | 7.5 |  |  |  |  |
|  | A-1b (Production Example 2) | parts by mass |  | 9 |  |  |  |
| A-2 | FG1700 | parts by mass |  |  | 37.5 |  | 80 |
| B | B-1 (FN2500) | parts by mass | 37.5 | 37.5 | 37.5 |  | 20 |
|  | B-2 (FN2200) | parts by mass |  |  |  | 43 |  |
|  | B-3 (FN1900) | parts by mass |  |  |  | 32 |  |
|  | B-4 (FN1700) | parts by mass | 30 | 28.5 |  |  |  |

TABLE 5-continued

|  |  |  | Example 26 | Example 27 | Example 28 | Comparative Example 9 | Comparative Example 10 |
|---|---|---|---|---|---|---|---|
| C | J055 | parts by mass |  |  |  |  |  |
|  | KS760K-12 | parts by mass |  |  |  |  |  |
|  | 1401X06 | parts by mass | 25 | 25 | 25 | 25 |  |
| Other | Irgafos 168 | parts by mass | 0.10 | 0.10 | 0.10 | 0.10 | 0.10 |
|  | Irganox 1076 | parts by mass | 0.10 | 0.10 | 0.10 | 0.10 | 0.10 |
| Polyorganosiloxane block content in PC-based resin (S) |  | mass % | 3.0 | 3.0 | 3.0 | 0.0 | 4.8 |
| Viscosity-average molecular weight (Mv) of PC-based resin (S) |  | — | 20,600 | 20,600 | 20,600 | 20,400 | 18,900 |
| Ratio of number of domains ($d^C$) to total number of domains ($d^C$) and ($d'^C$) |  | % | — | — | — | — | — |
| Average sectional area of all domains |  | nm² | — | — | — | — | — |
| Average distance of distances between adjacent particles of all domains |  | nm | — | — | — | — | — |
| MFR (300° C., 1.2 kg) |  | g/10 min | 65 | 74 | 65 | 70 | 12 |
| Q value (280° C., 160 kg) |  | ×0.01 ml/s | 25 | 25 | 36 | 33 | 10 |
| Izod impact strength (23° C.) |  | kJ/m² | 80 | 81 | 80 | 6 | 79 |
| Izod impact strength (0° C.) |  | kJ/m² | — | — | — | 7 | 76 |
| Izod impact strength (−10° C.) |  | kJ/m² | 12 | 13 | 13 | 7 | 73 |
| Izod impact strength (−20° C.) |  | kJ/m² | 11 | 12 | 12 | 7 | 72 |
| Izod impact strength (−30° C.) |  | kJ/m² | — | — | — | — | 70 |
| Izod impact strength (−40° C.) |  | kJ/m² | — | — | — | — | 68 |
| Deflection temperature under load |  | ° C. | 90 | 91 | 91 | 91 | 127 |
| Chemical resistance to isobutyl acetate |  |  | A | A | A | B | C |
| Chemical resistance to toluene |  |  | A | A | A | A | B |
| Chemical resistance to heptane |  |  | A | A | A | B | B |

TABLE 6

|  |  |  | Example 29 | Example 30 | Example 31 | Example 32 | Example 33 | Example 34 |
|---|---|---|---|---|---|---|---|---|
| A-1 | A-1a (Production Example 1) | parts by mass |  |  | 12 |  |  | 7.5 |
|  | A-1b (Production Example 2) | parts by mass |  | 14.4 |  |  | 9 |  |
| A-2 | FG1700 | parts by mass | 60 |  |  | 37.5 |  |  |
| B | B-1 (FN2500) | parts by mass | 15 | 15 | 15 | 37.5 | 37.5 | 37.5 |
|  | B-2 (FN2200) | parts by mass |  |  |  |  |  |  |
|  | B-3 (FN1900) | parts by mass |  |  |  |  |  |  |
|  | B-4 (FN1700) | parts by mass |  | 45.6 | 48 |  | 28.5 | 30 |
| C | J055 | parts by mass |  |  |  |  |  |  |
|  | KS760K-12 | parts by mass |  |  |  |  |  |  |
|  | 1401X06 | parts by mass |  |  |  |  |  |  |
|  | DURANEX 2002 EF2001N | parts by mass | 25 | 25 | 25 | 25 | 25 | 25 |
| Other | Irgafos 168 | parts by mass | 0.10 | 0.10 | 0.10 | 0.10 | 0.10 | 0.10 |
|  | Irganox 1076 | parts by mass | 0.10 | 0.10 | 0.10 | 0.10 | 0.10 | 0.10 |
| Polyorganosiloxane block content in PC-based resin (S) |  | mass % | 4.8 | 4.8 | 4.8 | 3.0 | 3.0 | 3.0 |
| Viscosity-average molecular weight (Mv) of PC-based resin (S) |  | — | 18,900 | 18,900 | 18,900 | 20,600 | 20,600 | 20,600 |

|  |  | Example 29 | Example 30 | Example 31 | Example 32 | Example 33 | Example 34 |
|---|---|---|---|---|---|---|---|
| Ratio of number of domains ($d^C$) to total number of domains ($d^C$) and ($d'^C$) | % | 0 | 100 | 94.1 | 0 | 89.7 | 86.9 |
| Average sectional area of all domains | nm² | 237 | 2,044 | 6,690 | 264 | 2,154 | 3,983 |
| Average distance of distances between adjacent particles of all domains | nm | 55 | 114 | 201 | 68 | 117 | 147 |
| MFR (300° C., 1.2 kg) | g/10 min | 32 | 29 | 30 | 29 | 27 | 28 |
| Q value (280° C., 160 kg) | ×0.01 ml/s | 21 | 19 | 21 | 16 | 15 | 15 |
| Izod impact strength (23° C.) | kJ/m² | 106 | 123 | 113 | 93 | 118 | 104 |
| Izod impact strength (0° C.) | kJ/m² | 98 | 111 | 107 | 14 | 99 | 97 |

TABLE 6-continued

| | | | | | | | |
|---|---|---|---|---|---|---|---|
| Izod impact strength (−10° C.) | kJ/m² | 55 | 105 | 104 | 13 | 19 | 88 |
| Izod impact strength (−20° C.) | kJ/m² | 16 | 97 | 97 | 12 | 16 | 17 |
| Izod impact strength (−30° C.) | kJ/m² | 15 | 83 | 88 | 11 | 15 | 15 |
| Izod impact strength (−40° C.) | kJ/m² | — | — | — | — | — | — |
| Deflection temperature under load | ° C. | 88 | 88 | 86 | 90 | 89 | 89 |
| Chemical resistance to isobutyl acetate | | A | A | A | A | A | A |
| Chemical resistance to toluene | | A | A | A | A | A | A |
| Chemical resistance to heptane | | A | A | A | A | A | A |

[Evaluation Test]
<Fluidity Evaluation>(MFR)

The amount (g/10 min) of a molten resin flowing out of a die having a diameter of 2.095±0.005 mm and a length of 8.000±0.025 mm was measured by using the above-mentioned pellet in conformity with JIS K 7210-1:2014 at 300° C. under a load of 1.2 kg.

<Q Value (Flow Value) [Unit; $10^{-2}$ mL/Sec]>

The amount (mL/sec) of a molten resin flowing out of a nozzle having a diameter of 1.00 mm and a length of 10.00 mm was measured by using the above-mentioned pellet and a Koka flow tester in conformity with JIS K 7210-1:2014: Appendix JA at 280° C. under a pressure of 160 kgf. A Q value represents an outflow amount per unit time, and a higher numerical value therefor means that the fluidity of the resin is better.

<Impact Resistance>

The pellet obtained in the foregoing was dried at 120° C. for 8 hours, and was then subjected to injection molding with an injection molding machine (manufactured by Nissei Plastic Industrial Co., Ltd., NEX110, screw diameter: 36 mmφ) at a cylinder temperature of 280° C. and a die temperature of 80° C. to produce an IZOD test piece (length: 63.5 mm, width: 12.7 mm, thickness: 3.2 mm). Notched Izod impact strengths at −40° C., −30° C., −20° C., −10° C., 0° C., and 23° C. were measured by using a test piece obtained by making a notch (r=0.25 mm±0.05 mm) in the test piece through post-processing in conformity with ASTM Standard D-256.

<Deflection Temperature under Load (Unit; ° C.)>

The pellet obtained in the foregoing was dried at 120° C. for 8 hours, and was then subjected to injection molding with an injection molding machine (manufactured by Nissei Plastic Industrial Co., Ltd., NEX110, screw diameter: 36 mmφ) at a cylinder temperature of 280° C. and a die temperature of 80° C. to provide a test piece (length: 127 mm, width: 12.7 mm, thickness: 3.2 mm). A load of 1.8 MPa was applied to the test piece in conformity with ASTM Standard D-648 at a rate of temperature increase of 120° C./h and a fulcrum-to-fulcrum distance of 100 mm, and the temperature at which the deflection of the test piece measured in an edgewise manner reached 0.26 mm was recorded.

<Chemical Resistance to Isobutyl Acetate>

The pellet obtained in the foregoing was subjected to injection molding at a molding temperature of 280° C. and a die temperature of 80° C. to provide a test piece measuring 127 mm long by 12.7 mm wide by 3.2 mm thick. A strain of 1.0% was applied to the test piece by a three-point bending test method at a span distance of 80 mm, and then isobutyl acetate was applied thereto with a swab. The test piece was left to stand at 23° C. for 2 minutes, and then a change in appearance thereof was observed, followed by an evaluation in accordance with the following criteria.

A case in which the sample was free of any appearance change or a fine crack occurred on its surface was indicated by Symbol "A".

A case in which a crack arrived from the surface of the sample to the opposite surface thereof in the thickness direction thereof was indicated by Symbol "B".

A case in which the sample broke and hence no stress was applied thereto with a jig was indicated by Symbol "C".

<Chemical Resistance to Toluene>

The pellet obtained in the foregoing was subjected to injection molding at a molding temperature of 280° C. and a die temperature of 80° C. to provide a test piece measuring 127 mm long by 12.7 mm wide by 3.2 mm thick. A strain of 1.0% was applied to the test piece by a three-point bending test method at a span distance of 80 mm, and then two drops of toluene was applied thereto with a pipette. The test piece was left to stand at 23° C. for 15 minutes, and then a change in appearance thereof was observed, followed by an evaluation in accordance with the following criteria.

A case in which the test piece did not whiten was indicated by Symbol "A".

A case in which the test piece whitened was indicated by Symbol "B".

<Chemical Resistance to Heptane>

The pellet obtained in the foregoing was subjected to injection molding at a molding temperature of 280° C. and a die temperature of 80° C. to provide a test piece measuring 127 mm long by 12.7 mm wide by 3.2 mm thick. A strain of 1.0% was applied to the test piece by a three-point bending test method at a span distance of 80 mm, and then a cloth was placed on the strained portion. Heptane was continuously dropped on the cloth at 23° C. for 30 minutes, and then a change in appearance of the test piece was observed, followed by an evaluation in accordance with the following criteria.

A case in which no crack occurred on the surface of the test piece was indicated by Symbol "A".

A case in which a crack occurred on the surface of the test piece was indicated by Symbol "B".

INDUSTRIAL APPLICABILITY

The polycarbonate-based resin composition obtained in the present invention is excellent in impact resistance and is excellent in chemical resistance. The molded article obtained by molding the polycarbonate-based resin composition can be suitably used as a casing and the like for parts for electrical and electronic equipment, and a part and the like for an automobile and a building material.

The invention claimed is:

1. A polycarbonate-based resin composition, comprising:
50 mass % or more to 99 mass % or less of a polycarbonate-based resin (S) containing a polycarbonate-polyorganosiloxane copolymer (A) containing a polycarbonate block (A-1) formed of a repeating unit represented by the following general formula (I) and a polyorganosiloxane block (A-2) containing a repeating unit represented by the following general formula (II), and an aromatic polycarbonate-based resin (B) except the polycarbonate-polyorganosiloxane copolymer (A); and
1 mass % or more to 50 mass % or less of a polyester-based resin (C),
wherein the polyorganosiloxane block (A-2) has an average chain length of from 50 or more to 500 or less:

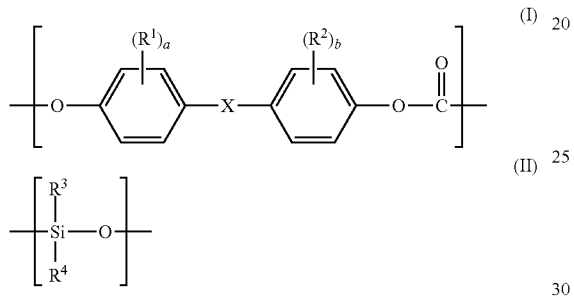

wherein $R^1$ and $R^2$ each independently represent a halogen atom, an alkyl group having 1 to 6 carbon atoms, or an alkoxy group having 1 to 6 carbon atoms, X represents a single bond, an alkylene group having 1 to 8 carbon atoms, an alkylidene group having 2 to 8 carbon atoms, a cycloalkylene group having 5 to 15 carbon atoms, a cycloalkylidene group having 5 to 15 carbon atoms, a fluorenediyl group, an arylalkylene group having 7 to 15 carbon atoms, an arylalkylidene group having 7 to 15 carbon atoms, —S—, —SO—, —SO$_2$—, —O—, or —CO—, $R^3$ and $R^4$ each independently represent a hydrogen atom, a halogen atom, an alkyl group having 1 to 6 carbon atoms, an alkoxy group having 1 to 6 carbon atoms, or an aryl group having 6 to 12 carbon atoms, and "a" and "b" each independently represent an integer of from 0 to 4.

2. A polycarbonate-based resin composition, comprising:
a polycarbonate-based resin (S) satisfying the following requirements (1) and (2); and
a polyester-based resin (C) to be blended into the polycarbonate-based resin (S),
wherein a ratio of the polycarbonate-based resin (S) to 100 mass % of a total amount of the polycarbonate-based resin (S) and the polyester-based resin (C) is from 50 mass % or more to 99 mass % or less:
(1) the polycarbonate-based resin (S) contains a polycarbonate-polyorganosiloxane copolymer (A) containing a polycarbonate block (A-1) formed of a repeating unit represented by the following general formula (I) and a polyorganosiloxane block (A-2) containing a repeating unit represented by the following general formula (II), and an aromatic polycarbonate-based resin (B) except the polycarbonate-polyorganosiloxane copolymer (A); and
(2) the polycarbonate-based resin (S) has a structure in which a domain (d-1) containing the polyorganosiloxane block (A-2) is present in a matrix containing the aromatic polycarbonate-based resin (B) as a main component, and a domain (d-2) containing at least one selected from a block derived from the aromatic polycarbonate-based resin (B) and the polycarbonate block (A-1) is present inside the domain (d-1):

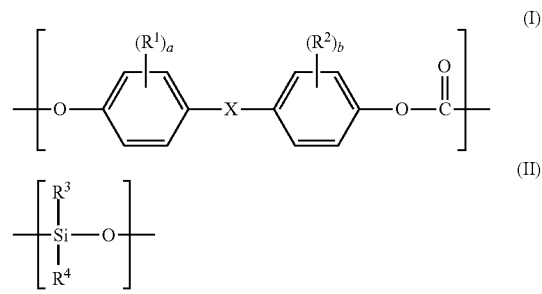

wherein $R^1$ and $R^2$ each independently represent a halogen atom, an alkyl group having 1 to 6 carbon atoms, or an alkoxy group having 1 to 6 carbon atoms, X represents a single bond, an alkylene group having 1 to 8 carbon atoms, an alkylidene group having 2 to 8 carbon atoms, a cycloalkylene group having 5 to 15 carbon atoms, a cycloalkylidene group having 5 to 15 carbon atoms, a fluorenediyl group, an arylalkylene group having 7 to 15 carbon atoms, an arylalkylidene group having 7 to 15 carbon atoms, —S—, —SO—, —SO$_2$—, —O—, or —CO—, $R^3$ and $R^4$ each independently represent a hydrogen atom, a halogen atom, an alkyl group having 1 to 6 carbon atoms, an alkoxy group having 1 to 6 carbon atoms, or an aryl group having 6 to 12 carbon atoms, and "a" and "b" each independently represent an integer of from 0 to 4.

3. A polycarbonate-based resin composition, comprising:
50 mass % or more to 99 mass % or less of a polycarbonate-based resin (S) containing a polycarbonate-polyorganosiloxane copolymer (A) containing a polycarbonate block (A-1) formed of a repeating unit represented by the following general formula (I) and a polyorganosiloxane block (A-2) containing a repeating unit represented by the following general formula (II), and an aromatic polycarbonate-based resin (B) except the polycarbonate-polyorganosiloxane copolymer (A); and
1 mass % or more to 50 mass % or less of a polyester-based resin (C),
wherein the polycarbonate-based resin composition has a structure in which a domain ($d^C$-1) containing the polyorganosiloxane block (A-2) is present in a matrix containing the aromatic polycarbonate-based resin (B) as a main component, and a domain ($d^C$-2) containing at least one selected from a block derived from the aromatic polycarbonate-based resin (B) and the polycarbonate block (A-1) is present inside the domain ($d^C$-1):

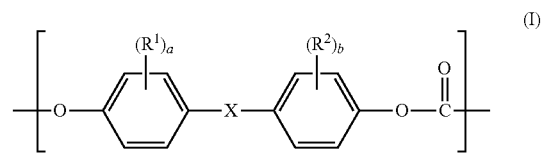

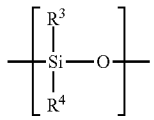

wherein $R^1$ and $R^2$ each independently represent a halogen atom, an alkyl group having 1 to 6 carbon atoms, or an alkoxy group having 1 to 6 carbon atoms, X represents a single bond, an alkylene group having 1 to 8 carbon atoms, an alkylidene group having 2 to 8 carbon atoms, a cycloalkylene group having 5 to 15 carbon atoms, a cycloalkylidene group having 5 to 15 carbon atoms, a fluorenediyl group, an arylalkylene group having 7 to 15 carbon atoms, an arylalkylidene group having 7 to 15 carbon atoms, —S—, —SO—, —SO$_2$—, —O—, or —CO—, $R^3$ and $R^4$ each independently represent a hydrogen atom, a halogen atom, an alkyl group having 1 to 6 carbon atoms, an alkoxy group having 1 to 6 carbon atoms, or an aryl group having 6 to 12 carbon atoms, and "a" and "b" each independently represent an integer of from 0 to 4.

4. The polycarbonate-based resin composition according to claim 1, wherein a mass ratio "(A)/(B)" of the polycarbonate-polyorganosiloxane copolymer (A) to the aromatic polycarbonate-based resin (B) in the polycarbonate-based resin (S) is from 0.1/99.9 to 99.9/0.1.

5. The polycarbonate-based resin composition according to claim 1, wherein the aromatic polycarbonate-based resin (B) contains a polycarbonate block including, in a main chain thereof, a repeating unit represented by the following general formula (III):

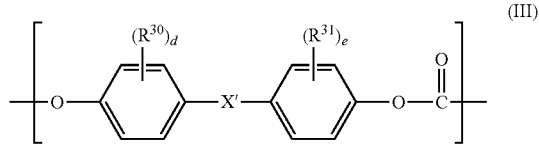

wherein $R^{30}$ and $R^{31}$ each independently represent a halogen atom, an alkyl group having 1 to 6 carbon atoms, or an alkoxy group having 1 to 6 carbon atoms, X' represents a single bond, an alkylene group having 1 to 8 carbon atoms, an alkylidene group having 2 to 8 carbon atoms, a cycloalkylene group having 5 to 15 carbon atoms, a cycloalkylidene group having 5 to 15 carbon atoms, —S—, —SO—, —SO$_2$—, —O—, or —CO—, and "d" and "e" each independently represent an integer of from 0 to 4.

6. The polycarbonate-based resin composition according to claim 3, wherein the domain (d-1) or (d$^C$-1) is mainly formed of the polyorganosiloxane block (A-2).

7. The polycarbonate-based resin composition according to claim 3, wherein the domain (d-2) or (d$^C$-2) is mainly formed of at least one selected from the block derived from the aromatic polycarbonate-based resin (B) and the polycarbonate block (A-1).

8. The polycarbonate-based resin composition according to claim 3, wherein only the one domain (d-2) is present inside the domain (d-1), or only the one domain (d$^C$-2) is present inside the domain (d$^C$-1).

9. The polycarbonate-based resin composition according to claim 3, wherein the two or more domains (d-2) are present inside the domain (d-1), or the two or more domains (d$^C$-2) are present inside the domain (d$^C$-1).

10. The polycarbonate-based resin composition according to claim 3, wherein a ratio of a number of domains (d) in each of which the domain (d-2) is present inside the domain (d-1) to a total number of the domains (d) and domains (d') each formed only of the domain (d-1), or a ratio of a number of domains (d$^C$) in each of which the domain (d$^C$-2) is present inside the domain (d$^C$-1) to a total number of the domains (d$^C$) and domains (d'$^C$) each formed only of the domain (d$^C$-1) is from 2% or more to 100% or less.

11. The polycarbonate-based resin composition according to claim 10, wherein all domains corresponding to a total of the domains (d) and the domains (d') or a total of the domains (d$^C$) and the domains (d'$^C$) have an average sectional area of 200 nm$^2$ or more.

12. The polycarbonate-based resin composition according to claim 11, wherein all domains corresponding to a total of the domains (d) and the domains (d') or a total of the domains (d$^C$) and the domains (d'$^C$) have an average sectional area of 20,000 nm$^2$ or less.

13. The polycarbonate-based resin composition according to claim 10, wherein an average of distances between adjacent particles of all domains corresponding to a total of the domains (d) and the domains (d') or a total of the domains (d$^C$) and the domains (d'$^C$) is 500 nm or less.

14. The polycarbonate-based resin composition according to claim 13, wherein an average of distances between adjacent particles of all domains corresponding to a total of the domains (d) and the domains (d') or a total of the domains (d$^C$) and the domains (d'$^C$) is 50 nm or more.

15. The polycarbonate-based resin composition according to claim 3, wherein the polyorganosiloxane block (A-2) has an average chain length of from 30 or more to 500 or less.

16. The polycarbonate-based resin composition according to claim 3, wherein the polyorganosiloxane block (A-2) has an average chain length of from 55 or more to 500 or less.

17. The polycarbonate-based resin composition according to claim 1, wherein a content of the polyorganosiloxane block (A-2) in the polycarbonate-polyorganosiloxane copolymer (A) is from 10 mass % or more to 70 mass % or less.

18. The polycarbonate-based resin composition according to claim 1, wherein a content of the polyorganosiloxane block (A-2) in the polycarbonate-based resin (S) is from 0.1 mass % or more to 10 mass % or less.

19. The polycarbonate-based resin composition according to claim 1, wherein the polycarbonate-polyorganosiloxane copolymer (A) has a viscosity-average molecular weight (Mv) of from 9,000 or more to 50,000 or less.

20. The polycarbonate-based resin composition according to claim 1, wherein the polycarbonate-based resin (S) has a viscosity-average molecular weight (Mv) of from 9,000 or more to 50,000 or less.

21. The polycarbonate-based resin composition according to claim 1, wherein the polyester-based resin (C) comprises at least one selected from a polyethylene terephthalate and a polybutylene terephthalate.

22. A molded article, which is obtained by molding the polycarbonate-based resin composition of claim 1.

23. The molded article according to claim 22, wherein the molded article comprises a casing for electrical and electronic equipment.

24. The molded article according to claim 22, wherein the molded article comprises parts for an automobile and a building material.

* * * * *